(12) United States Patent
Sawada et al.

(10) Patent No.: US 11,214,190 B1
(45) Date of Patent: Jan. 4, 2022

(54) HEADLAMP CONTROL DEVICE

(71) Applicant: TOYOTA JIDOSHA KABUSHIKI KAISHA, Toyota (JP)

(72) Inventors: Tomonari Sawada, Nagoya (JP); Fumio Inoue, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/241,239

(22) Filed: Apr. 27, 2021

(30) Foreign Application Priority Data

Jun. 16, 2020 (JP) .............................. JP2020-103713

(51) Int. Cl.
*H05B 47/10* (2020.01)
*B60Q 1/14* (2006.01)
*H05B 47/11* (2020.01)

(52) U.S. Cl.
CPC .............. *B60Q 1/143* (2013.01); *H05B 47/11* (2020.01); *B60Q 2300/314* (2013.01); *B60Q 2300/32* (2013.01)

(58) Field of Classification Search
CPC .......... H05B 47/10; H05B 47/11; B60Q 1/04; B60Q 1/1423; B60Q 1/143; B60Q 2300/314; B60Q 2300/32
See application file for complete search history.

(56) References Cited

U.S. PATENT DOCUMENTS

| 9,050,928 | B2* | 6/2015 | Nakashima | ............. B60Q 1/14 |
| 2015/0243017 | A1* | 8/2015 | Fujimoto | ................ G01S 17/42 348/142 |
| 2018/0038568 | A1 | 2/2018 | Sawada | |

FOREIGN PATENT DOCUMENTS

| JP | 2009262579 A | 11/2009 |
| JP | 2010120457 A | 6/2010 |
| JP | 2018020683 A | 2/2018 |

* cited by examiner

*Primary Examiner* — Jimmy T Vu
(74) *Attorney, Agent, or Firm* — Dickinson Wright, PLLC

(57) ABSTRACT

A headlamp control device estimates, in a case where an ambient illuminance of a subject vehicle is equal to or lower than a predetermined switching illuminance when a state of a headlamp is the ON state, a time required for the subject vehicle to travel to an entrance of a tunnel in front of the subject vehicle, as a first time, switches, in a case where the first time is longer than a first determination time, the headlamp state from a low-beam state to a high-beam state, and, keeps, in a case where the first time is equal to or shorter than the first determination time, the headlamp state as the low-beam state.

7 Claims, 13 Drawing Sheets

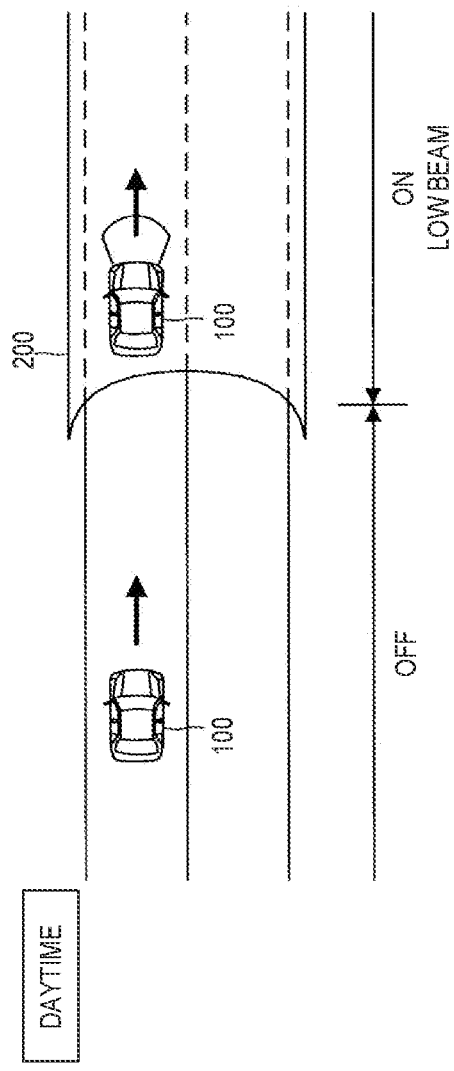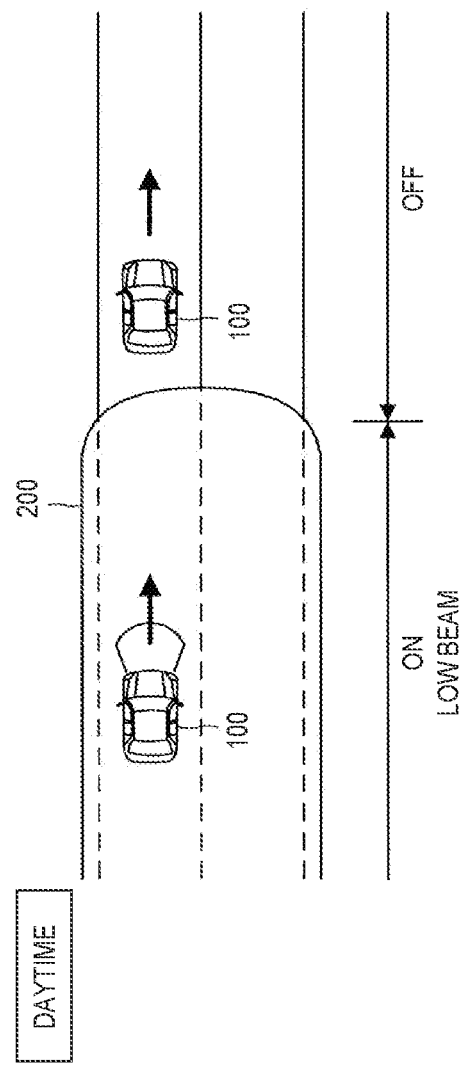

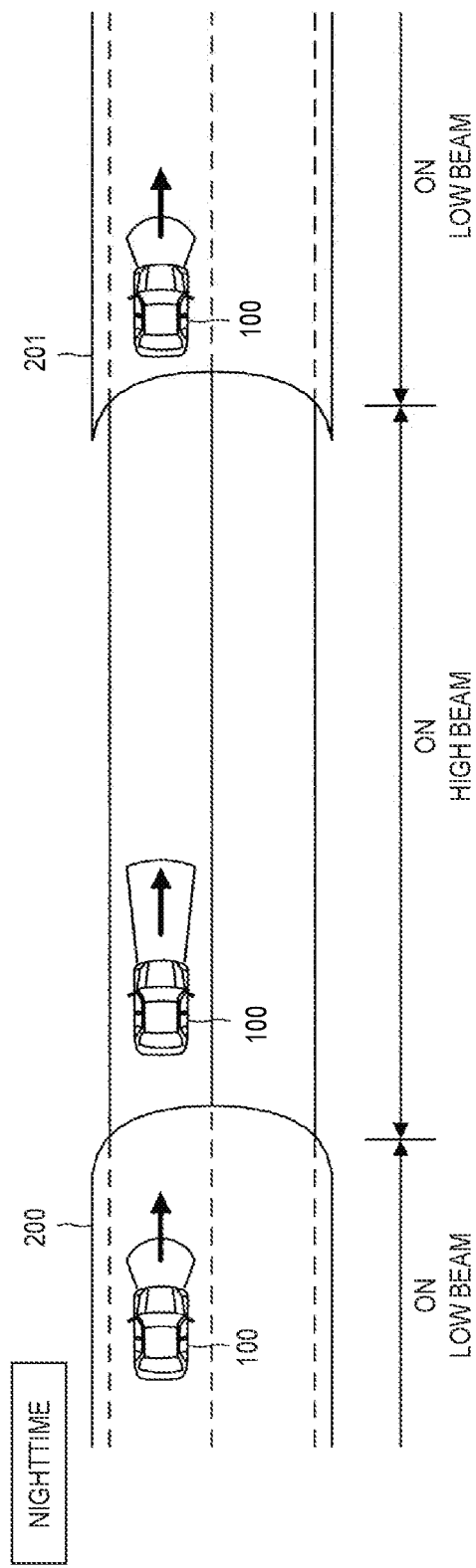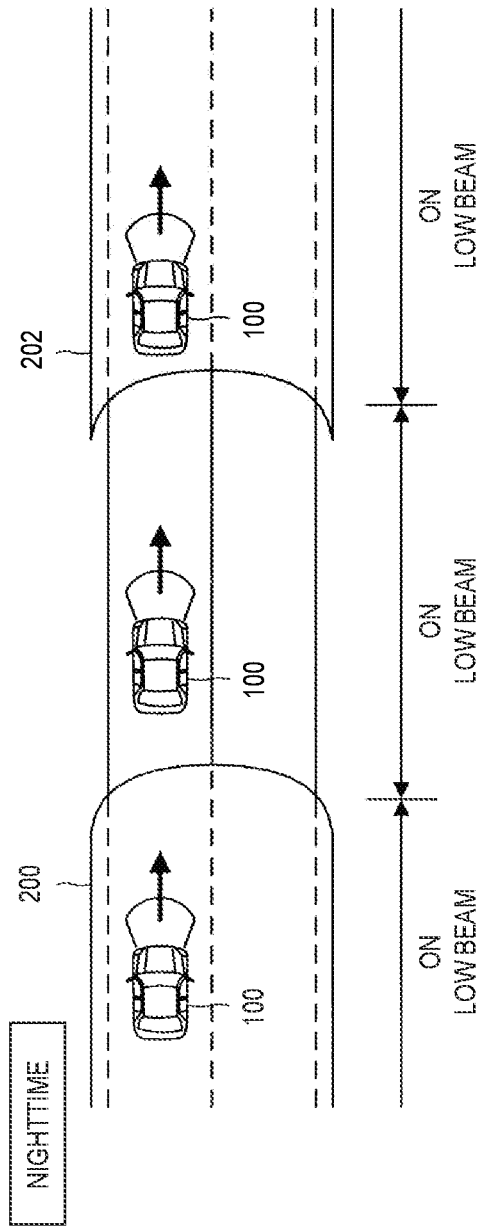

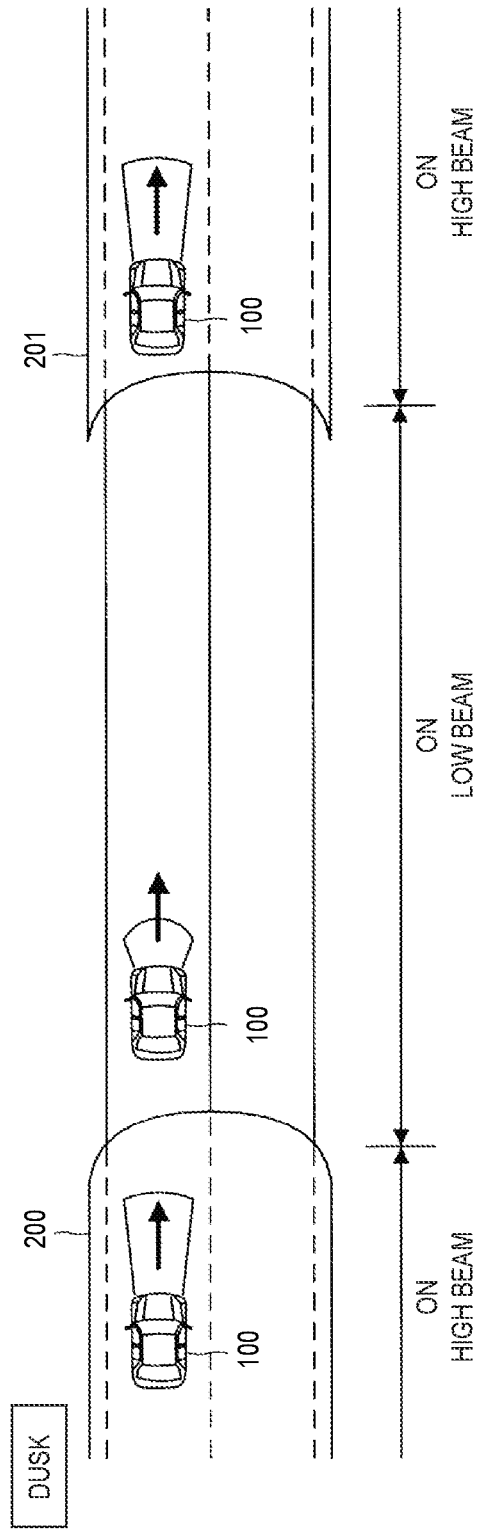
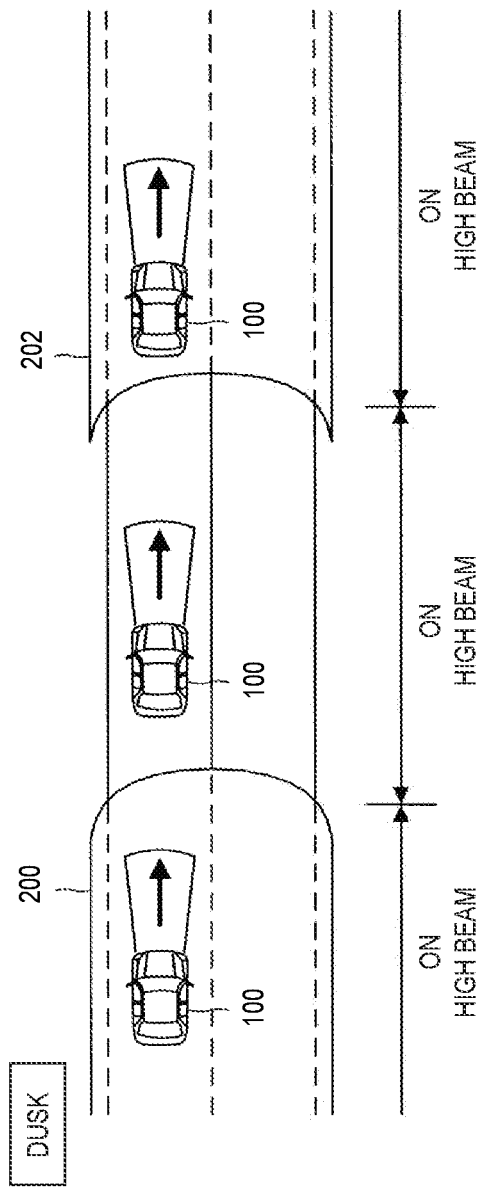

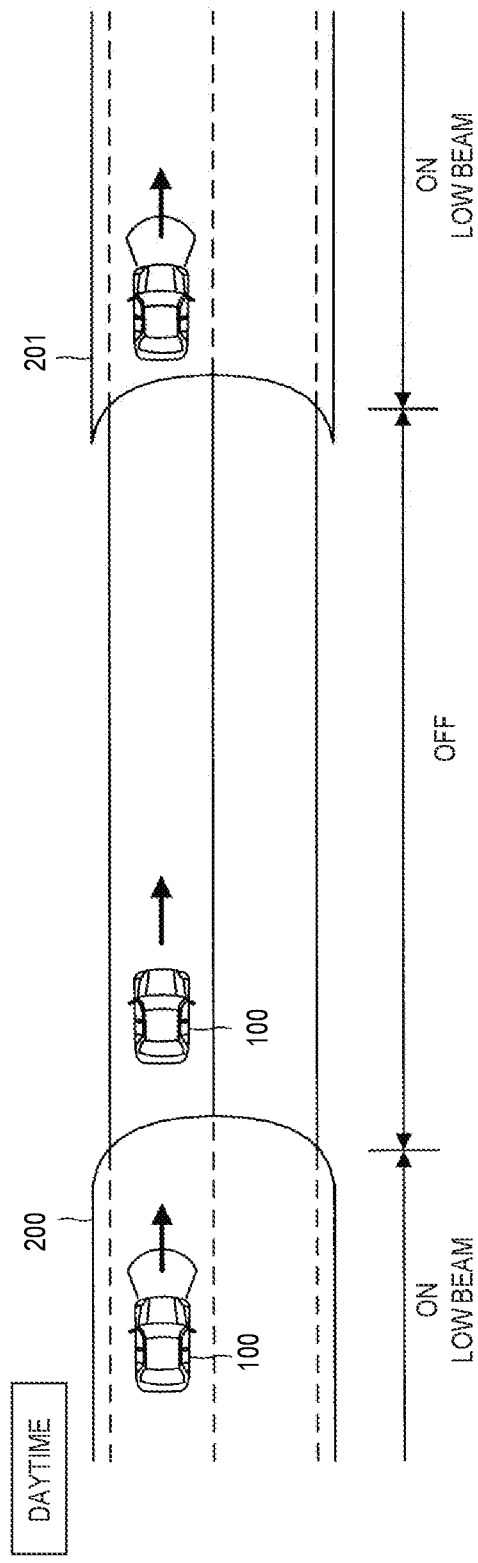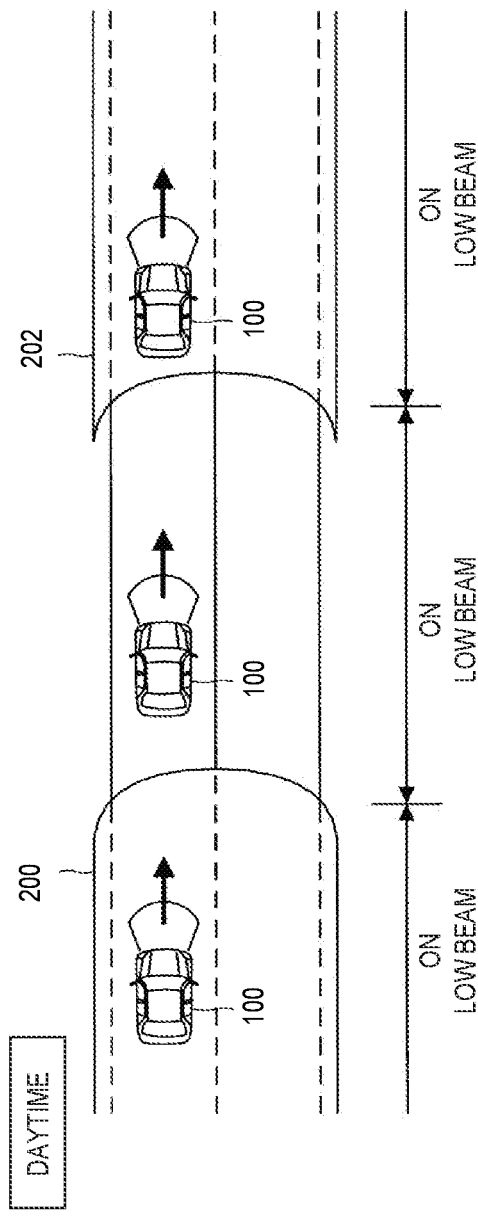

HEADLAMP CONTROL DEVICE

CROSS-REFERENCE TO RELATED APPLICATION

This application claims priority to Japanese Patent Application No. 2020-103713 filed on Jun. 16, 2020, incorporated herein by reference in its entirety.

BACKGROUND

1. Technical Field

The present disclosure relates to a headlamp control device.

2. Description of Related Art

A headlamp control device in which headlamps are automatically turned on when illuminance is low in front of a subject vehicle and automatically turned off when the illuminance is high in front of the subject vehicle is well-known. According to this device, the headlamps are turned on when the subject vehicle enters a tunnel and turned off when the subject vehicle leaves the tunnel during the daytime. However, tunnels may be built so as to be close to each other. In such a case, the headlamps are turned off each time the vehicle leaves a tunnel, and turned on each time the vehicle enters another tunnel. That is, the headlamps are repeatedly turned on and off at short intervals. Consequently, it is highly likely that a driver of the subject vehicle may be inconvenienced.

A headlamp control device configured to address such shortcomings has been suggested (see, for example, Japanese Unexamined Patent Application Publication No. 2009-262579). When the illuminance in front of the subject vehicle is equal to or higher than a predetermined illuminance while the headlamps are turned on, the device keeps the headlamp turned on without turning them off and stores the illuminance at that time. The device turns off the headlamps if the illuminance in front of the subject vehicle becomes higher than the stored illuminance after a certain period of time, and otherwise keeps the headlamps turned on. Further, the device turns off the headlamps if the illuminance in front of the subject vehicle is equal to or higher than a predetermined illuminance after a certain period of time, and otherwise keeps the headlamps turned on.

With this device, even if the illuminance in front of the subject vehicle is equal to or higher than the predetermined illuminance when the vehicle leaves the tunnel, the headlamps are kept on without being turned off. If a next tunnel is located near the tunnel, the subject vehicle will approach the next tunnel in a relatively short period of time. Consequently, when the subject vehicle reaches or enters the next tunnel, the illuminance in front of the subject vehicle is equal to or higher than the predetermined illuminance and the certain period of time has not elapsed. Therefore, when the certain period of time elapses, the illuminance in front of the subject vehicle has not increased above the stored illuminance, and the headlamps are kept turned on. If the vehicle is traveling in the next tunnel when the certain period of time has further elapsed, the headlamps remain turned on because the illuminance in front of the subject vehicle is lower than the predetermined illuminance. As stated above, the device is intended to prevent the headlamps from being repeatedly turned on and off at short intervals.

SUMMARY

With a conventional headlamp control device, depending on a length of the certain period of time, the subject vehicle may enter the next tunnel immediately after the headlamps are tunnel off and then the headlamps may be turned on again. In this case, the headlamps are turned on and off in a short period of time, which may cause the driver to be inconvenienced.

Furthermore, the conventional headlamp control device controls the headlamps such that they are automatically turned on and off during the daytime, but it is desirable that the driver is not inconvenienced even when the headlamps are automatically turned on and off at nighttime.

The present disclosure provides a headlamp control device that automatically controls an ON state and OFF state of headlamps such that the driver is not inconvenienced during the daytime as well as at nighttime.

According to a first aspect of the present disclosure, a headlamp control device includes an illuminance detection device that detects an ambient illuminance which is an illuminance around a subject vehicle, and a control unit configured to execute headlamp control for automatically switching a state of a headlamp of the subject vehicle between an ON state where the headlamp is turned on and an OFF state where the headlamp is turned off, and automatically switching the state of the headlamp between a high-beam state where a headlight angle of the headlamp is set to a high-beam angle and a low-beam state where the headlight angle is set to a low-beam angle.

The control unit switches, in a case where the ambient illuminance is equal to or lower than a predetermined on and off illuminance, switch the headlamp state from the OFF state to the ON state, and switches, in a case where the ambient illuminance is higher than the predetermined on and off illuminance, the headlamp state from the ON state to the OFF state.

The control unit estimates, in a case where the ambient illuminance is equal to or lower than a predetermined switching illuminance when the headlamp state is the ON state, a time required for the subject vehicle to travel to an entrance of a tunnel in front of the subject vehicle, as a first time, switches, in a case where the first time is longer than a first determination time, the headlamp state from the low-beam state to the high-beam state, and, keeps, in a case where the first time is equal to or shorter than the first determination time, the headlamp state as the low-beam state.

For example, in a case where the vehicle travels on a road where two tunnels are built close to each other at nighttime, a lamp state (that is a headlamp state) is automatically switched between the low-beam state and the high-beam state depending on brightness around the vehicle. Since it is brighter inside the tunnel than outside the tunnel, the lamp state is set to be the low-beam state inside a first tunnel, is switched from the low-beam state to the high-beam state when the vehicle leaves the first tunnel, and then is switched from the high-beam state to the low-beam state when the vehicle enters a second tunnel. In other words, the lamp state is switched twice. If a distance is short between the two tunnels and a relatively short time is required for the vehicle to leave the first tunnel and enter the second tunnel, the lamp state is switched twice in a short period of time. In such a case, a driver of the vehicle may be inconvenienced.

With the headlamp control device of the present disclosure, when the subject vehicle leaves the first tunnel and it is dark around the subject vehicle (when the ambient illuminance is equal to or lower than the predetermined switching illuminance), and in a case where the time required for the subject vehicle to travel to the entrance of the second tunnel is short (in a case where the first time is equal to or shorter than the first determination time), the lamp state is kept as the low-beam state. Therefore, even if the subject vehicle enters the second tunnel and it is bright around the subject vehicle (even if the ambient illuminance is higher than the predetermined switching illuminance), the lamp state is kept in the low-beam state. Accordingly, the lamp state is not switched twice in a short period of time. Consequently, it is possible to prevent the driver of the vehicle from being inconvenienced.

In the headlamp control device according to the first aspect of the present disclosure, the control unit may be configured to, in a case where the ambient illuminance is higher than the predetermined switching illuminance when the headlamp state is the ON state, estimate a time required for the subject vehicle to travel to the entrance of the tunnel in front of the subject vehicle, as a second time. The control unit may switch, in a case where the second time is longer than a second determination time, the headlamp state from the high-beam state to the low-beam state, and keep, in a case where the second time is equal to or shorter than the second determination time, the headlamp state as the high-beam state.

For example, when it is dim in the evening, it may be brighter outside the tunnel than inside the tunnel. At this time, when the vehicle travels on a road where two tunnels are built close to each other at nighttime, the lamp state is automatically switched between the low-beam state and the high-beam state depending on the brightness around the vehicle. The lamp state is set to be the high-beam state inside the first tunnel, is switched from the high-beam state to the low-beam state when the vehicle leaves the first tunnel, and then is switched from the low-beam state to the high-beam state when the vehicle enters a second tunnel. In other words, the lamp state is switched twice. If a distance is short between the two tunnels and a relatively short time is required for the vehicle to leave the first tunnel and enter the second tunnel, the lamp state is switched twice in a short period of time. In such a case, a driver of the vehicle may be inconvenienced.

With the headlamp control device of the present disclosure, when the subject vehicle leaves the first tunnel and it is bright around the subject vehicle (when the ambient illuminance is higher than the predetermined switching illuminance), and in a case where the time required for the subject vehicle to travel to the entrance of the second tunnel is short (in a case where the second time is equal to or shorter than the second determination time), the lamp state is kept in the high-beam state. Therefore, even if the subject vehicle enters the second tunnel and it is dark around the subject vehicle (even if the ambient illuminance is equal or lower than the predetermined switching illuminance), the lamp state is kept in the high-beam state. Accordingly, the lamp state is not switched twice in a short period of time. Consequently, it is possible to prevent the driver of the vehicle from being inconvenienced.

According to a second aspect of the present disclosure, a headlamp control device includes an illuminance detection device that detects illuminance around a subject vehicle as an ambient illuminance, and detects illuminance in a tunnel in front of the subject vehicle as a tunnel illuminance, and a control unit configured to execute headlamp control for automatically switching a state of a headlamp of the subject vehicle between an ON state where the headlamp is turned on and an OFF state where the headlamp is turned off, and automatically switching the state of the headlamp between a high-beam state where a headlight angle of the headlamp is set to a high-beam angle and a low-beam state where the headlight angle is set to a low-beam angle, The control unit switches, in a case where the ambient illuminance is equal to or lower than a predetermined on and off illuminance, the headlamp state from the OFF state to the ON state, and switches, in a case where the ambient illuminance is higher than the predetermined on and off illuminance, the headlamp state from the ON state to the OFF state.

Furthermore, the control unit estimates, in a case where the ambient illuminance is equal to or lower than a predetermined switching illuminance when the headlamp state is the ON state, a time required for the subject vehicle to travel to an entrance of the tunnel in front of the subject vehicle, as a first time, switches, in a case where the first time is longer than a first determination time, the headlamp state from the low-beam state to the high-beam state, switches, in a case where the first time is equal to or shorter than the first determination time and the tunnel illuminance is equal to or lower than the predetermined switching illuminance, the headlamp state from the low-beam state to the high-beam state, and keeps, in a case where the first time is equal to or shorter than the first determination time and the tunnel illuminance is higher than the predetermined switching illuminance, the headlamp state as the low-beam state.

For example, when two tunnels are built close to each other, it may be dark inside the second tunnel and thus the high-beam state may be desirable in the second tunnel. In a case where the time required for the vehicle to leave the first tunnel and enter the second tunnel is short, the lamp state is set to be the low-beam state regardless of the brightness inside the second tunnel. Consequently, if the lamp state is set to the low-beam state inside the first tunnel, the low-beam state is kept when the vehicle leaves the first tunnel, and then is switched from the low-beam state to the high-beam state when the vehicle enters the second tunnel. In this case, the lamp state is switched only once, but the driver has to drive the vehicle in the low-beam state during a period between leaving the first tunnel and entering the second tunnel.

With the headlamp control device of the present disclosure, when the subject vehicle leaves the first tunnel and it is bright around the subject vehicle (when the ambient illuminance is higher than the predetermined switching illuminance), and in a case where the time required for the subject vehicle to travel to the entrance of the second tunnel is short (the first time is equal to or shorter than the first determination time) and it is dark inside the second tunnel (the tunnel illuminance is equal to or lower than the predetermined switching illuminance), the lamp state is switched from the low-beam state to the high-beam state. Consequently, the driver can drive the subject vehicle in the high-beam state during the period between leaving the first tunnel and entering the second tunnel. In this case, if the subject vehicle leaves the first tunnel and then enters the second tunnel, the lamp state is switched only once.

In the headlamp control device according to the second aspect of the present disclosure, the control unit may be configured to, in a case where the ambient illuminance is higher than the predetermined switching illuminance when the headlamp state is the ON state, estimate a time required for the subject vehicle to travel to the entrance of the tunnel in front of the subject vehicle, as a second time. The control unit may switch, in a case where the second time is longer than the second determination time, the headlamp state from the high-beam state to the low-beam state, keep in a case where the second time is equal to or shorter than the second determination time and the tunnel illuminance is equal to or lower than the predetermined switching illuminance, the headlamp state as the high-beam state, and switch, in a case where the second time is equal to or shorter than the second determination time and the tunnel illuminance is higher than the predetermined switching illuminance, the headlamp state from the high-beam state to the low-beam state.

For example, when two tunnels are built close to each other, it may be dark inside the second tunnel and thus the high-beam state may be desirable in the second tunnel. In a case where the time required for the vehicle to leave the first tunnel and enter the second tunnel is short, the lamp state is set to be the low-beam state regardless of the brightness inside the second tunnel. Consequently, if the lamp state is set to the high-beam state inside the first tunnel, the lamp state is switched from the high-beam state to the low-beam state when the vehicle leaves the first tunnel, and then is switched from the low-beam state to the high-beam state when the vehicle enters the second tunnel. Accordingly, the lamp state is switched twice in a short time. Further, the driver has to drive the subject vehicle in the low-beam state during the period between leaving the first tunnel and entering the second tunnel.

With the headlamp control device of the present disclosure, when the subject vehicle leaves the first tunnel and it is bright around the subject vehicle (when the ambient illuminance is higher than the predetermined switching illuminance), and in a case where the time required for the subject vehicle to travel to the entrance of the second tunnel is short (the second time is equal to or shorter than the second determination time) and it is dark inside the second tunnel (the tunnel illuminance is equal to or lower than the predetermined switching illuminance), the lamp state is kept as the high-beam state. Therefore, even if the subject vehicle leaves the first tunnel and then enters the second tunnel in a short period of time, the lamp state is not switched. Consequently, it is possible to prevent the driver of the vehicle from being inconvenienced. Moreover, the driver can drive the subject vehicle in the high-beam state during the period between leaving the first tunnel and entering the second tunnel.

According to a third aspect of the present disclosure, a headlamp control device includes an illuminance detection device that detects an ambient illuminance which is an illuminance around a subject vehicle, and a control unit configured to be capable of executing headlamp control for automatically switching a state of a headlamp of the subject vehicle between an ON state where the headlamp is turned on and an OFF state where the headlamp is turned off.

The control unit switches, in a case where the ambient illuminance is equal to or lower than a predetermined on and off illuminance, the headlamp state from the OFF state to the ON state. Furthermore, the control unit estimates, in a case where the ambient illuminance is higher than the predetermined on and off illuminance, a time required for the subject vehicle to travel to an entrance of a tunnel in front of the subject vehicle, as a required time, switches, in a case where the required time is longer than a predetermined determination time, the headlamp state from the ON state to the OFF state, and keeps, in a case where the required time is equal to or shorter than the predetermined determination time, the headlamp state as the ON state.

For example, in a case where the vehicle travels on a road where two tunnels are built close to each other during the daytime, the lamp state (that is the headlamp state) is automatically switched between the ON state and the OFF state depending on the brightness around the vehicle. Since it is brighter outside the tunnel than inside the tunnel, the lamp state is set to be the ON state inside the first tunnel, is switched from the ON state to the OFF state when the vehicle leaves the first tunnel, and then is switched from the OFF state to the ON state when the vehicle enters the second tunnel. In other words, the lamp state is switched twice. If a distance is short between the two tunnels and a relatively short time is required for the vehicle to leave the first tunnel and enter the second tunnel, the lamp state is switched twice in a short period of time. In such a case, a driver of the vehicle may be inconvenienced.

With the headlamp control device of the present disclosure, when the subject vehicle leaves the first tunnel and it is bright around the subject vehicle (when the ambient illuminance is higher than the predetermined switching illuminance), and in a case where the time required for the subject vehicle to travel to the entrance of the second tunnel is short (in a case where the required time is equal to or shorter than the predetermined determination time), the lamp state is kept as the ON state. Therefore, even if the subject vehicle enters the second tunnel and it is dark around the subject vehicle (even if the ambient illuminance is equal or lower than the predetermined switching illuminance), the lamp state is kept in the ON state. Accordingly, the lamp state is not switched twice in a short period of time. Consequently, it is possible to prevent the driver of the vehicle from being inconvenienced.

According to a fourth aspect of the present disclosure, a headlamp control device includes an illuminance detection device that detects an illuminance around a subject vehicle as an ambient illuminance, and a control unit configured to be capable of executing headlamp control for automatically switching a state of a headlamp of the subject vehicle between an ON state where the headlamp is turned on and an OFF state where the headlamp is turned off, and automatically switching the state of the headlamp between a high-beam state where a headlight angle of the headlamp is set to a high-beam angle and a low-beam state where the headlight angle is set to a low-beam angle.

The control unit switches, in a case where the ambient illuminance is equal to or lower than a predetermined on and off illuminance, the headlamp state from the OFF state to the ON state. Furthermore, the control unit estimates, in a case where the ambient illuminance is higher than the predetermined on and off illuminance, a time required for the subject vehicle to travel to an entrance of a tunnel in front of the subject vehicle, as a required time, switches, in a case where the required time is longer than a predetermined determination time, the headlamp state from the ON state to the OFF state, and keeps, in a case where the required time is equal to or shorter than the predetermined determination time, the headlamp state as the ON state.

Further, the control unit estimates, in a case where the ambient illuminance is equal to or lower than a predetermined switching illuminance when the headlamp state is the ON state, a time required for the subject vehicle to travel to an entrance of a tunnel in front of the subject vehicle, as a first time, switches, in a case where the first time is longer than a first determination time, the headlamp state from the low-beam state to the high-beam state, and keeps, in a case where the first time is equal to or shorter than the first determination time, the headlamp state as the low-beam state.

Consequently, the headlamp control device according to the fourth aspect of the present disclosure has the same advantageous effect as the effect obtained from the headlamp control device according to the third aspect of the present disclosure. It also has the same advantageous effect as the effect obtained from the headlamp control device according to the first aspect of the present disclosure.

In the headlamp control device according to the fourth aspect of the present disclosure, the control unit may be configured to, in a case where the ambient illuminance is higher than the predetermined switching illuminance when the headlamp state is the ON state, estimate a time required for the subject vehicle to travel to the entrance of the tunnel in front of the subject vehicle, as a second time. The control unit may switch, in a case where the second time is longer than a second determination time, the headlamp state from the high-beam state to the low-beam state, and keep, in a case where the second time is equal to or shorter than the second determination time, the headlamp state as the high-beam state.

Consequently, when the subject vehicle leaves the first tunnel and it is bright around the subject vehicle (when the ambient illuminance is higher than the predetermined switching illuminance), and in a case where the time required for the subject vehicle to travel to the entrance of the second tunnel is short (in a case where the second time is equal to or shorter than the second determination time), the lamp state is kept as the high-beam state. Therefore, even if the subject vehicle enters the second tunnel and it is dark around the subject vehicle (even if the ambient illuminance is equal or lower than the predetermined switching illuminance), the lamp state is kept in the high-beam state. Accordingly, the lamp state is not switched twice in a short period of time. Consequently, it is possible to prevent the driver of the vehicle from being inconvenienced.

Configurations of the present disclosure are not limited to embodiments of the present disclosure, which will be described later referring to the drawings. Other objects, features, and advantages of the present disclosure will be readily understood from the description on the embodiments of the present disclosure.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 2A is a diagram illustrating an operation of the headlamp control device according to the embodiment of the present disclosure when a subject vehicle 100 enters a tunnel during the daytime, and FIG. 2B is a diagram illustrating an operation of the headlamp control device according to the embodiment of the present disclosure when the subject vehicle 100 leaves the tunnel during the daytime;

FIG. 3A is a diagram illustrating an operation of the headlamp control device according to the embodiment of the present disclosure when a time required for the subject vehicle to travel between tunnels is relatively long at nighttime, and FIG. 3B is a diagram illustrating an operation of the headlamp control device according to the embodiment of the present disclosure when a time required for the subject vehicle to travel between tunnels is relatively short at nighttime;

FIG. 4A is a diagram illustrating an operation of the headlamp control device according to the embodiment of the present disclosure when a time required for the subject vehicle to travel between tunnels is relatively long at dusk, and FIG. 4B is a diagram illustrating an operation of the headlamp control device according to the embodiment of the present disclosure when a time required for the subject vehicle to travel between tunnels is relatively short at dusk;

FIG. 14A is a diagram illustrating an operation of a headlamp control device according to a second modified example of the embodiment of the present disclosure when a time required for the subject vehicle to travel between tunnels is relatively long during the daytime, and FIG. 14B is a diagram illustrating an operation of the headlamp control device according to the second modified example of the present disclosure when a time required for the subject vehicle to travel between tunnels is relatively short during the daytime.

DETAILED DESCRIPTION OF EMBODIMENTS

Figure 1:
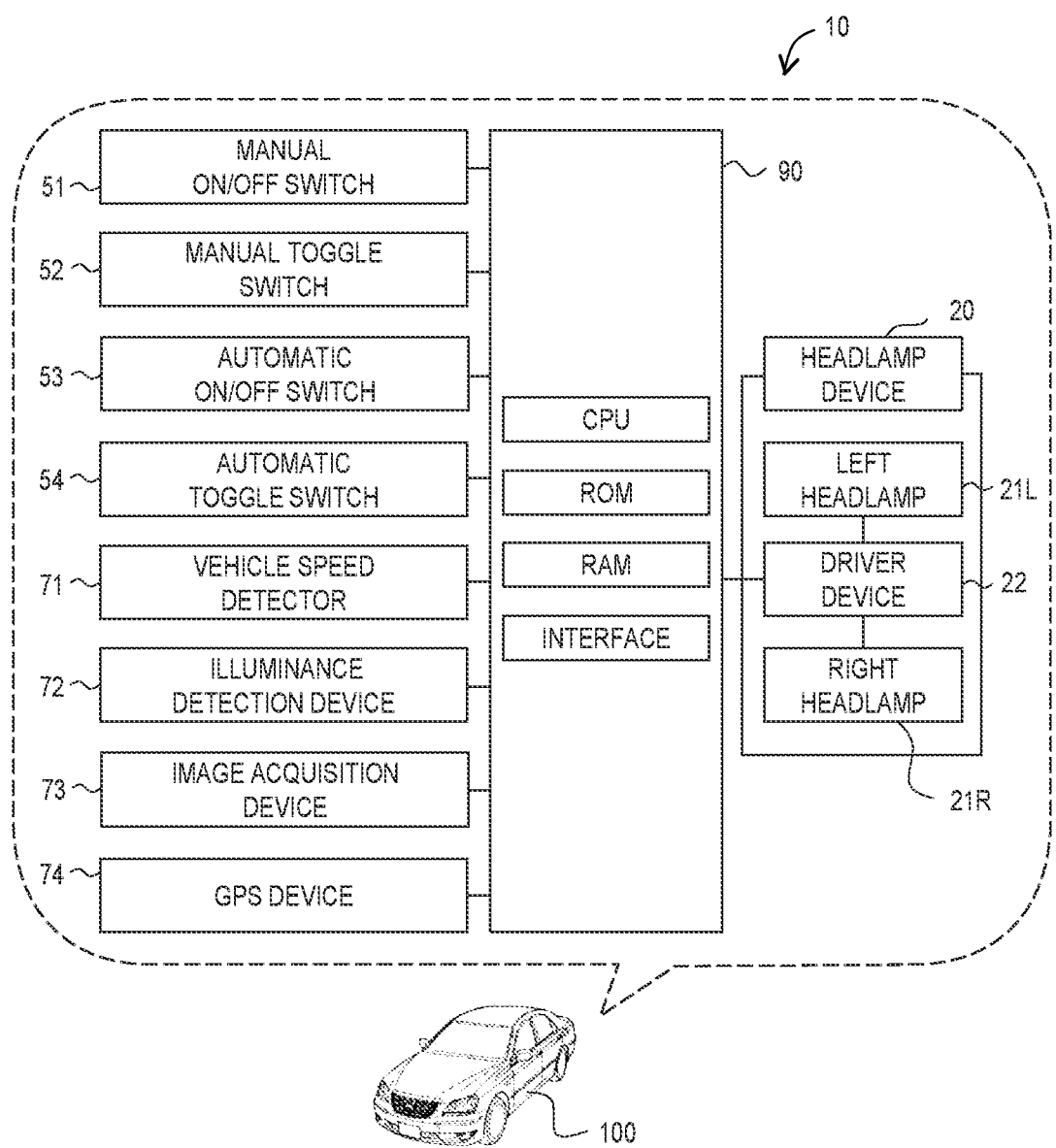
FIG. 1 is a diagram illustrating a headlamp control device according to an embodiment of the present disclosure, and a vehicle on which the headlamp control device is mounted.

Hereinafter, a headlamp control device according to an embodiment of the present disclosure will be described referring to the drawings. As shown in FIG. 1, a headlamp control device 10 according to the embodiment of the present disclosure is mounted on a vehicle 100. Hereinafter, the vehicle 100 will be referred to as a "subject vehicle 100".

A headlamp device 20 is mounted on the subject vehicle 100. The headlamp device 20 includes a left headlamp 21L, a right headlamp 21R, and a driver device 22.

The left headlamp 21L is attached to a front left side of a vehicle body of the subject vehicle 100 so as to illuminate the front of the subject vehicle 100. The right headlamp 21R is attached to a front right side of a vehicle body of the subject vehicle 100 so as to illuminate the front of the subject vehicle 100. Hereinafter, the left headlamp 21L and the right headlamp 21R are collectively referred to as "headlamps 21."

The headlamps 21 are configured to be selectively set to any of two states, one of these states is a state where the headlamps mainly illuminate a part relatively close to the subject vehicle 100 (hereinafter referred to as "low-beam state"), or the other is a state where the headlamps mainly illuminate a part relatively far from the subject vehicle 100 (hereinafter referred to as "high-beam state"). Therefore, the low-beam state is a state where an emission angle (headlight angle) of the light from the headlamps 21 is an angle (low-beam angle) in which the light is directed relatively close to the subject vehicle 100, while the high-beam state is a state where the emission angle (headlight angle) of the light from the headlamps 21 is an angle (high-beam angle) in which the light is directed relatively far from the subject vehicle 100. For example, the low-beam state is a state where the headlamps 21 illuminate the front of the subject vehicle 100 below the horizontal plane of the subject vehicle 100, and the high-beam state is a state where the headlamps 21 illuminate the front of the subject vehicle 100 horizontally or slightly above the horizontal plane.

The driver device 22 is a device for turning on and off the headlamps 21. The driver device 22 is also a device for switching the headlamps 21 between the low-beam state and the high-beam state.

The headlamp control device 10 includes an ECU 90. The ECU 90 is an electronic control unit, which includes a CPU, a ROM, a RAM, and an interface.

The driver device 22 is electrically connected to the ECU 90. The ECU 90 can switch the headlamps 21 between an ON state and an OFF state by operating the driver device 22. Further, the ECU 90 can switch the headlamps 21 between the low-beam state and the high-beam state by operating the driver device 22.

Further, the headlamp control device 10 includes a manual on/off switch 51, a manual toggle switch 52, an automatic on/off switch 53, an automatic toggle switch 54, a vehicle speed detector 71, an illuminance detection device 72, an image acquisition device 73, and a GPS device 74.

The manual on/off switch 51 is a switch operated by, for example, a driver of the subject vehicle 100 to automatically turn on or off the headlamps 21. The manual on/off switch 51 is configured to be set to be in any of two positions, a position where the headlamps 21 are turned on (ON position) or a position where the headlamps 21 are turned off (OFF position). The manual on/off switch 51 is electrically connected to the ECU 90. The manual on/off switch 51 transmits a high signal to the ECU 90 in a case where it is set to be in the ON position. Receiving the high signal, the ECU 90 operates the driver device 22 to turn the headlamps 21 on. Meanwhile, the manual on/off switch 51 transmits a low signal to the ECU 90 in a case where it is set to be in the OFF position. Receiving the low signal, the ECU 90 operates the driver device 22 to turn the headlamps 21 off.

The manual toggle switch 52 is a switch operated by, for example, the driver of the subject vehicle 100 to switch the headlamps 21 between the low-beam state and the high-beam state. The manual toggle switch 52 is configured to be set to be in any of two positions, a position where the headlamps 21 are in the low-beam state (low-beam position) or a position where the headlamps 21 are in the high-beam state (high-beam position). The manual toggle switch 52 is electrically connected to the ECU 90. The manual toggle switch 52 transmits a high signal to the ECU 90 in a case where it is set to be in the low-beam position. Receiving the high signal, the ECU 90 operates the driver device 22 to set the headlamps 21 to be in the low-beam state. Meanwhile, the manual toggle switch 52 transmits a low signal to the ECU 90 in a case where it is set to be in the high-beam position. Receiving the low signal, the ECU 90 operates the driver device 22 to set the headlamps 21 to be in the high-beam state.

The automatic on/off switch 53 is a switch operated by, for example, the driver of the subject vehicle 100. The automatic on/off switch 53 is configured to be set to be in any of two positions, an automatic on/off request position or an automatic on/off stop position. The automatic on/off request position is a position where the ECU 90 is requested to execute automatic on/off control described later, and the automatic on/off stop position is a position where the ECU 90 is requested to stop the automatic on/off control. The automatic on/off switch 53 is electrically connected to the ECU 90. The automatic on/off switch 53 transmits a high signal to the ECU 90 in a case where it is set to be in the automatic on/off request position. Receiving the high signal, the ECU 90 executes the automatic on/off control described later. Meanwhile, the automatic on/off switch 53 transmits a low signal to the ECU 90 in a case where it is set to be in the automatic on/off stop position. Receiving the low signal, the ECU 90 stops the automatic on/off control.

The automatic toggle switch 54 is a switch operated by, for example, the driver of the subject vehicle 100. The automatic toggle switch 54 is configured to be set to be in any of two positions, an automatic switching request position or an automatic switching stop position. The automatic switching request position is a position where the ECU 90 is requested to execute automatic switching control described later, and the automatic switching stop position is a position where the ECU 90 is requested to stop the automatic switching control. The automatic toggle switch 54 is electrically connected to the ECU 90. The automatic toggle switch 54 transmits a high signal to the ECU 90 in a case where it is set to be in the automatic switching request position. Receiving the high signal, the ECU 90 executes the automatic switching control described later. Meanwhile, the automatic toggle switch 54 transmits a low signal to the ECU 90 in a case where it is set to be in the automatic switching stop position. Receiving the low signal, the ECU 90 stops the automatic switching control.

The automatic on/off switch 53 and the automatic toggle switch 54 may be integrated into a single switch. In such a case, the switch is configured to be set to any of two positions, a position (automatic request position) where the ECU 90 is requested to execute the automatic on/off control or the automatic switching control, or a position (automatic stop position) where the ECU 90 is requested to stop the automatic on/off control and the automatic switching control. In a case where such a switch is set to be in the automatic request position, the ECU 90 executes the automatic on/off control and the automatic switching control. Meanwhile, in a case where such a switch is set to be in the automatic stop position, the ECU 90 stops the automatic on/off control and the automatic switching control.

The illuminance detection device 72 includes an illuminance sensor that detects illuminance. The illuminance sensor is attached to the subject vehicle 100 so as to detect the illuminance around the subject vehicle 100. The illuminance detection device 72 is electrically connected to the ECU 90. The illuminance detection device 72 detects the illuminance around the subject vehicle 100 using the illuminance sensor, and transmits the detected illuminance data to the ECU 90. The ECU 90 acquires the illuminance around the subject vehicle 100 as an ambient illuminance LUM_S, based on the transmitted data.

The vehicle speed detector 71 includes a wheel speed sensor that detects rotational speed of each wheel of the subject vehicle 100. The vehicle speed detector 71 is electrically connected to the ECU 90. The vehicle speed detector 71 detects the rotational speed of each wheel using the wheel speed sensor, and transmits the detected rotational speed data to the ECU 90. The ECU 90 acquires the traveling speed of the subject vehicle 100 as a vehicle speed SPD, based on the transmitted data.

The image acquisition device 73 includes a camera, such as a CCD camera. The camera is attached to the subject vehicle 100 so as to capture the front of the subject vehicle 100. The image acquisition device 73 is electrically connected to the ECU 90. The image acquisition device 73 transmits, to the ECU 90, the image data obtained by capturing the front of the subject vehicle 100 with the camera. The ECU 90 confirms a situation in front of the subject vehicle 100 based on the data.

The GPS device 74 receives a GPS signal. The GPS device 74 is electrically connected to the ECU 90. The GPS device 74 transmits the received GPS signal to the ECU 90. The ECU 90 acquires a location of the subject vehicle 100 based on the GPS signal.

The ECU 90 stores map information. The ECU 90 may be configured to acquire the map information from, for example, a server.

Operation of Headlamp Control Device

The operation of the headlamp control device 10 will be described hereinbelow. The headlamp control device 10 is configured to be capable of executing headlamp control. The headlamp control includes the automatic on/off control and the automatic switching control. The automatic on/off control is control for automatically turning the headlamps 21 on or off. The automatic switching control is control for automatically switching a state of the headlamps 21 between the low-beam state and the high-beam state. Hereinafter, the state of the headlamps 21 will be referred to as a "lamp state".

Automatic On/Off Control

In a case where the ECU 90 is requested to execute the automatic on/off control by operating the automatic on/off switch 53, the ECU 90 executes the automatic on/off control described below.

That is, in a case where the ambient illuminance LUM_S is equal to or lower than a predetermined on and off illuminance LUM_on when the headlamps 21 are turned off, the ECU 90 turns the headlamps 21 on.

For example, when the headlamps 21 are turned off and it is dark around the subject vehicle 100 at dusk, the ambient illuminance LUM_S drops to the predetermined on and off illuminance LUM_on, whereby the headlamps 21 are turned on. As shown in FIG. 2A, when the headlamps 21 are turned off and the subject vehicle 100 enters a tunnel 200 during the daytime, the ambient illuminance LUM_S drops to the predetermined on and off illuminance LUM_on, whereby the headlamps 21 are turned on.

In this example, the predetermined on and off illuminance LUM_on is set to an illuminance higher than the typical illuminance in the tunnel. Therefore, when the subject vehicle 100 enters the tunnel, the ambient illuminance LUM_S is equal to or lower than the predetermined on and off illuminance LUM_on.

Meanwhile, in a case where the ambient illuminance LUM_S is higher than the predetermined on and off illuminance LUM_on when the headlamps 21 are turned on, the ECU 90 turns the headlamps 21 off.

For example, when the headlamps 21 are turned on and it is bright around the subject vehicle 100 after sunrise, the ambient illuminance LUM_S is higher than the predetermined on and off illuminance LUM_on, whereby the headlamps 21 are turned off. As shown in FIG. 2B, when the subject vehicle 100 is traveling in the tunnel 200 and the headlamps 21 are turned on during the daytime and the subject vehicle 100 leaves the tunnel 200 with the headlamps 21 turned on, the ambient illuminance LUM_S is higher than the predetermined on and off illuminance LUM_on, whereby the headlamps 21 are turned off.

Automatic Switching Control

In a case where the ECU 90 is requested to execute the automatic switching control by operating the automatic toggle switch 54, the ECU 90 executes the automatic switching control described below.

That is, in a case where the ambient illuminance LUM_s is equal to or lower than a predetermined switching illuminance LUM_ch when the headlamps 21 are turned on in the low-beam state, the ECU 90 estimates a time required for the subject vehicle 100 to enter the tunnel in front of the subject vehicle as a first time $T_{req\_1}$, and determines whether the first time $T_{req\_1}$ is equal to or shorter than a first determination time $T_{req\_1\_th}$. How the first time $T_{req\_1}$ is calculated will be described later. Further, the predetermined switching illuminance LUM_ch is set to a value lower than the predetermined on and off illuminance LUM_on.

In a case where the first time $T_{req\_1}$ is longer than the first determination time $T_{req\_1\_th}$, the ECU 90 switches the lamp state from the low-beam state to the high-beam state. In a case where no tunnel is detected in front of the subject vehicle 100, the ECU 90 determines that the first time $T_{req\_1}$ is longer than the first determination time $T_{req\_1\_th}$.

For example, as shown in FIG. 3A, when the headlamps 21 are turned on in the low-beam state and the subject vehicle 100, which is traveling inside the first tunnel 200, leaves the first tunnel 200 at nighttime, and thus the ambient illuminance LUM_S is equal to or lower than the predetermined switching illuminance LUM_ch, if it is determined that the first time $T_{req\_1}$ is longer than the first determination time $T_{req\_1\_th}$, the lamp state is switched from the low-beam state to the high-beam state. When the subject vehicle 100 enters a second tunnel 201 and the ambient illuminance LUM_S is higher than the predetermined switching illuminance LUM_ch, the lamp state is switched from the high-beam state to the low-beam state.

Meanwhile, in a case where the first time $T_{req\_1}$ is equal to or shorter than the first determination time $T_{req\_1\_th}$, the ECU 90 keeps the lamp state as the low-beam state.

For example, as shown in FIG. 3B, when the headlamps 21 are turned on in the low-beam state and the subject vehicle 100, which is traveling inside the first tunnel 200, leaves the first tunnel 200 at nighttime, and thus the ambient illuminance LUM_S is equal to or lower than the predetermined switching illuminance LUM_ch, if it is determined that the first time $T_{req\_1}$ is equal to or shorter than the first determination time $T_{req\_1\_th}$, the lamp state is kept as the low-beam state. When the subject vehicle 100 enters a second tunnel 202 and the ambient illuminance LUM_S is higher than the predetermined switching illuminance LUM_ch, the lamp state is kept as the low-beam state.

Further, in a case where the ambient illuminance LUM_s is higher than the predetermined switching illuminance LUM_ch when the headlamps 21 are turned on in the high-beam state, the ECU 90 estimates a time required for the subject vehicle 100 to enter the tunnel in front of the subject vehicle as a second time $T_{req\_2}$, and determines whether the second time $T_{req\_2}$ is equal to or shorter than a second determination time $T_{req\_2\_th}$. How the second time $T_{req\_2}$ is calculated will be described later. In a case where no tunnel is detected in front of the subject vehicle 100, the ECU 90 determines that the second time $T_{req\_2}$ is longer than the second determination time $T_{req\_2\_th}$. In this example, the second determination time $T_{req\_2\_th}$ is set to the same length as the first determination time $T_{req\_1\_th}$, but may be set to have a length different from that of the first determination time $T_{req\_1\_th}$.

In a case where the second time $T_{req\_2}$ is longer than the second determination time $T_{req\_2\_th}$, the ECU 90 switches the lamp state from the high-beam state to the low-beam state.

For example, as shown in FIG. 4A, when the headlamps 21 are turned on in the high-beam state and the subject vehicle 100, which is traveling inside the first tunnel 200, leaves the first tunnel 200 at dusk, and thus the ambient illuminance LUM_S is higher than the predetermined switching illuminance LUM_ch, if it is determined that the second time $T_{req\_2}$ is longer than the second determination time $T_{req\_2\_th}$, the lamp state is switched from the high-beam state to the low-beam state. When the subject vehicle 100 enters the second tunnel 201 and the ambient illuminance LUM_S is equal to or lower than the predetermined switching illuminance LUM_ch, the lamp state is switched from the low-beam state to the high-beam state.

Meanwhile, in a case where the second time $T_{req\_2}$ is equal to or shorter than the second determination time $T_{req\_2\_th}$, the ECU 90 keeps the lamp state as the high-beam state.

For example, as shown in FIG. 4B, when the headlamps 21 are turned on in the high-beam state and the subject vehicle 100, which is traveling inside the first tunnel 200, leaves the first tunnel 200 at dusk, and thus the ambient illuminance LUM_S is higher than the predetermined switching illuminance LUM_ch, if it is determined that the second time $T_{req\_2}$ is equal to or shorter than the second determination time $T_{req\_2\_th}$, the lamp state is kept as the high-beam state. When the subject vehicle 100 enters the second tunnel 202 and the ambient illuminance LUM_S is equal to or lower than the predetermined switching illuminance LUM_ch, the lamp state is kept as the high-beam state.

Figure 5:
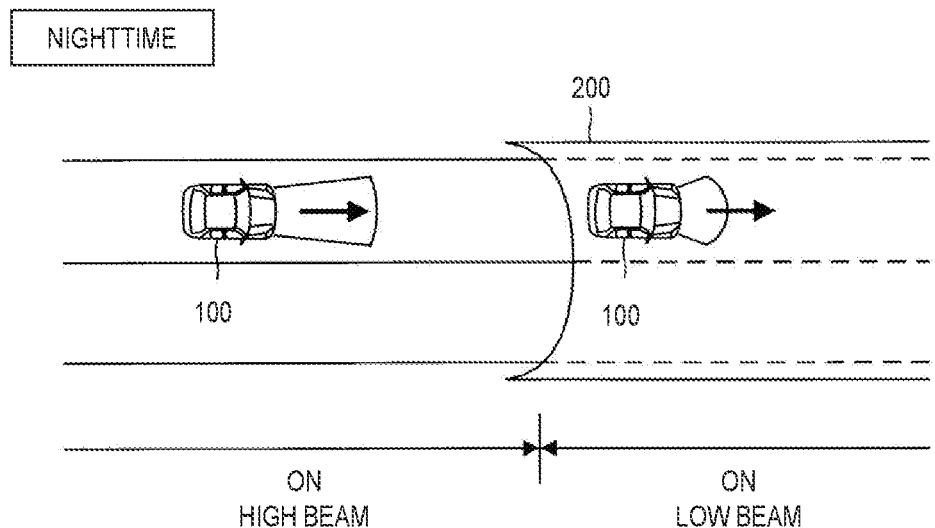
FIG. 5 is a diagram illustrating an operation of the headlamp control device according to the embodiment of the present disclosure when the subject vehicle 100 enters the tunnel at nighttime.

Further, as shown in FIG. 5, when the subject vehicle 100 enters the tunnel 200 and the ambient illuminance LUM_S is higher than the predetermined switching illuminance LUM_ch at nighttime, and thus it is determined that the second time $T_{req\_2}$ is longer than the second determination time $T_{req\_2}$, and when the lamp state is the high-beam state, the lamp state is switched from the high-beam state to the low-beam state.

In this example, in a case where an oncoming vehicle approaches from the front of the subject vehicle 100 at nighttime, and the lamp state is the high-beam state when the ambient illuminance LUM_S is higher than the predetermined switching illuminance LUM_ch due to the light from headlamps of the oncoming vehicle, the ECU 90 switches the lamp state from the high-beam state to the low-beam state. In a case where the oncoming vehicle passes the subject vehicle 100 and the ambient illuminance LUM_S is equal to or lower than the predetermined switching illuminance LUM_ch, the ECU 90 switches the lamp state from the low-beam state to the high-beam state.

Calculation of First and Second Times

How the first time $T_{req\_1}$ and the second time $T_{req\_2}$ are calculated will be described hereinbelow. The ECU 90 determines whether an image captured by the camera of the image acquisition device 73 (hereinafter referred to as "camera image IMG") contains an image of a tunnel.

When the camera image IMG contains the image of the tunnel, the ECU 90 estimates a distance D between the host vehicle 100 and the next tunnel based on the image of the tunnel. The ECU 90 calculates the time required for the host vehicle 100 to enter the next tunnel from the estimated distance D and the vehicle speed SPD, as the first time $T_{req\_1}$ or the second time $T_{req\_2}$.

Further, the ECU 90 may calculate the required time $T_{req}$ based on a current location of the subject vehicle 100 and the map information. In this case, the ECU 90 acquires the current location of the subject vehicle 100 based on the GPS signal. Additionally, the ECU 90 acquires the distance D to the tunnel in front of the subject vehicle 100, based on the current location of the subject vehicle 100 and the map information. The ECU 90 calculates the first time $T_{req\_1}$ or the second time $T_{req\_2}$ from the acquired distance D and the vehicle speed SPD.

When the camera image IMG does not contain the image of the tunnel, the ECU 90 determines that the first time $T_{req\_1}$ or the second time $T_{req\_2}$ is longer than the first determination time $T_{req\_1\_th}$ or the second determination time $T_{req\_2\_th}$, respectively.

The operation of the headlamp control device 10 has been described. Accordingly, in a case where the subject vehicle 100 travels from a tunnel to a tunnel in a short time, it is possible to prevent the lamp state from being switched when the vehicle leaves the first tunnel and enters the second tunnel. Therefore, in a case where the subject vehicle 100 is traveling on a road where the tunnels are built close to each other, it is possible to prevent the lamp state from being switched between the low-beam state and the high-beam state at short intervals. Consequently, it is possible to prevent the driver of the subject vehicle 100 from being inconvenienced.

Specific Operation of Headlamp Control Device

The specific operation of the headlamp control device 10 will be described hereinbelow. The CPU of the ECU 90 in the headlamp control device 10 executes an automatic on/off control routine shown in FIG. 6 at each of predetermined time intervals.

Figure 6:
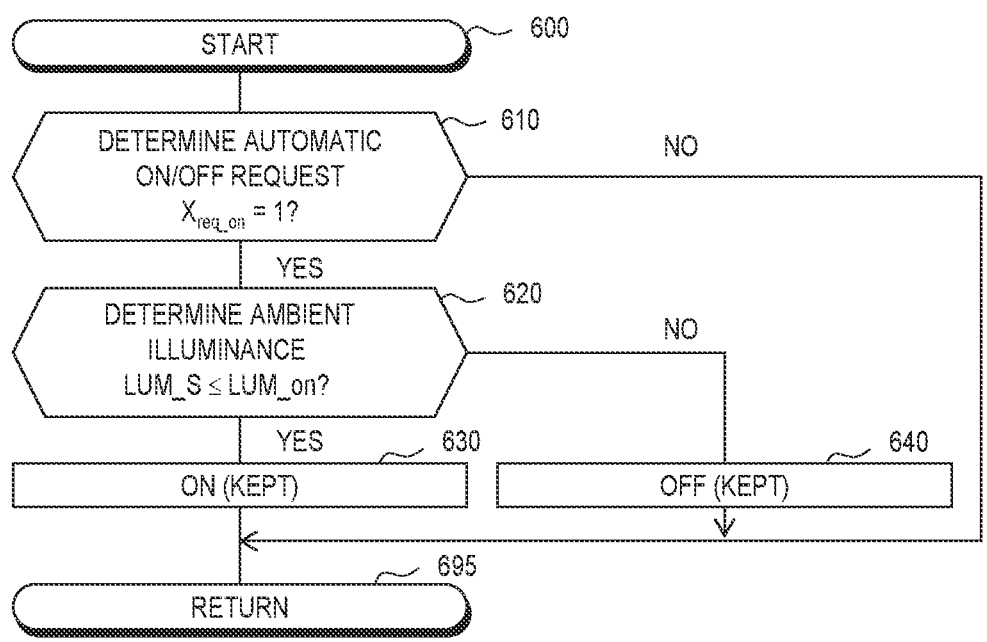
FIG. 6 is a flowchart showing a routine executed by the headlamp control device according to the embodiment of the present disclosure.

Therefore, the CPU starts a process from step 600 of FIG. 6 at a predetermined timing, proceeds to step 610, and determines whether an automatic on/off request flag $X_{req\_on}$ has a value of "1". The automatic on/off request flag $X_{req\_on}$ is a flag indicating an operation position of the automatic on/off switch 53. The value of the automatic on/off request flag $X_{req\_on}$ is set to "1" when the automatic on/off switch 53 is set to be in the automatic on/off request position. Meanwhile, the value of the automatic on/off request flag $X_{req\_on}$ is set to "0" when the automatic on/off switch 53 is set to be in the automatic on/off stop position.

In a case where it is determined as "YES" in step 610, the process proceeds to step 620 and the CPU determines whether the ambient illuminance LUM_S is equal to or lower than the predetermined on and off illuminance LUM_on.

In a case where it is determined as "YES" in step 620, the process proceeds to step 630, and the CPU turns the headlamps 21 on if the headlamps 21 are turned off at that time, and keeps the headlamps 21 turned on if the headlamps 21 are turned on at that time. The CPU proceeds to step 695 and ends this routine.

Meanwhile, in a case where it is determined as "NO" in step 620, the process proceeds to step 640, and the CPU turns the headlamps 21 off if the headlamps 21 are turned on at that time, and keeps the headlamps 21 turned off if the headlamps 21 are turned off at that time. The CPU proceeds to step 695 and ends this routine.

Figure 7:
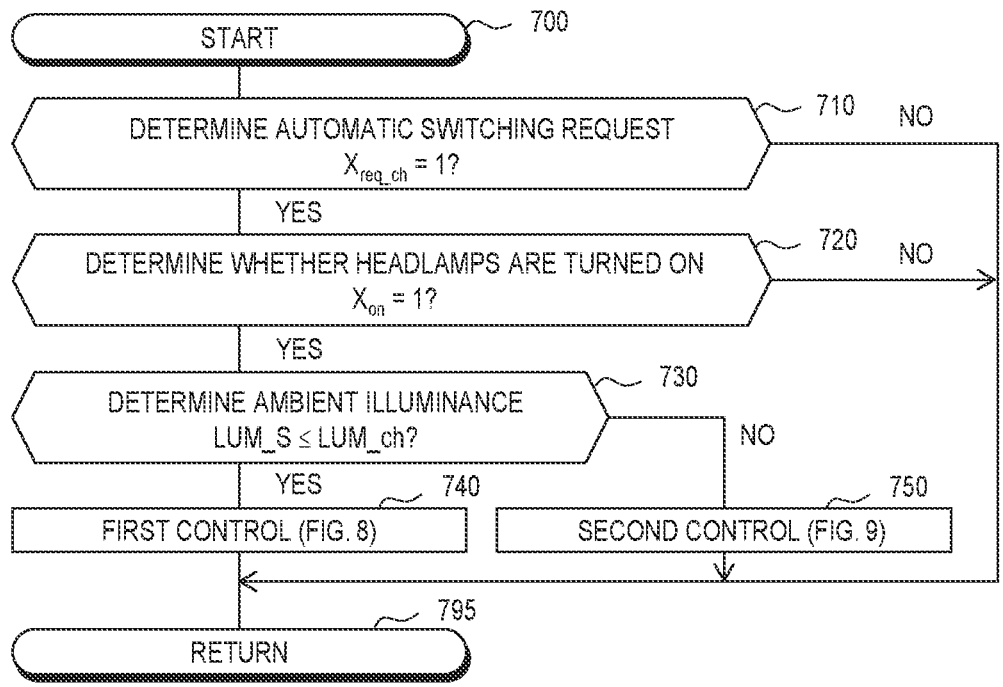
FIG. 7 is a flowchart showing a routine executed by the headlamp control device according to the embodiment of the present disclosure.

Further, the CPU executes an automatic switching control routine shown in FIG. 7 at each of predetermined time intervals. Therefore, the CPU starts a process from step 700 of FIG. 7 at a predetermined timing, proceeds to step 710, and determines whether an automatic switching request flag $X_{req\_on}$ has a value of "1". The automatic switching request flag $X_{req\_ch}$ is a flag indicating an operation position of the automatic toggle switch 54. The value of the automatic switching request flag $X_{req\_ch}$ is set to "1" when the automatic toggle switch 54 is set to be in the automatic switching request position. Meanwhile, the value of the automatic switching request flag $X_{req\_ch}$ is set to "0" when the automatic toggle switch 54 is set to be in the automatic switching stop position.

In a case where it is determined as "YES" in step 710, the process proceeds to step 720 and the CPU determines whether an ON flag $X_{on}$ has a value of "1". The ON flag $X_{on}$ is a flag indicating that the headlamps 21 are turned on. The ON flag $X_{on}$ is set to "1" when the headlamps 21 are turned on. Meanwhile, the ON flag $X_{on}$ is set to "0" when the headlamps 21 are turned off.

In a case where it is determined as "YES" in step 720, the process proceeds to step 730 and the CPU determines whether the ambient illuminance LUM_S is equal to or lower than the predetermined switching illuminance LUM_ch.

Figure 8:
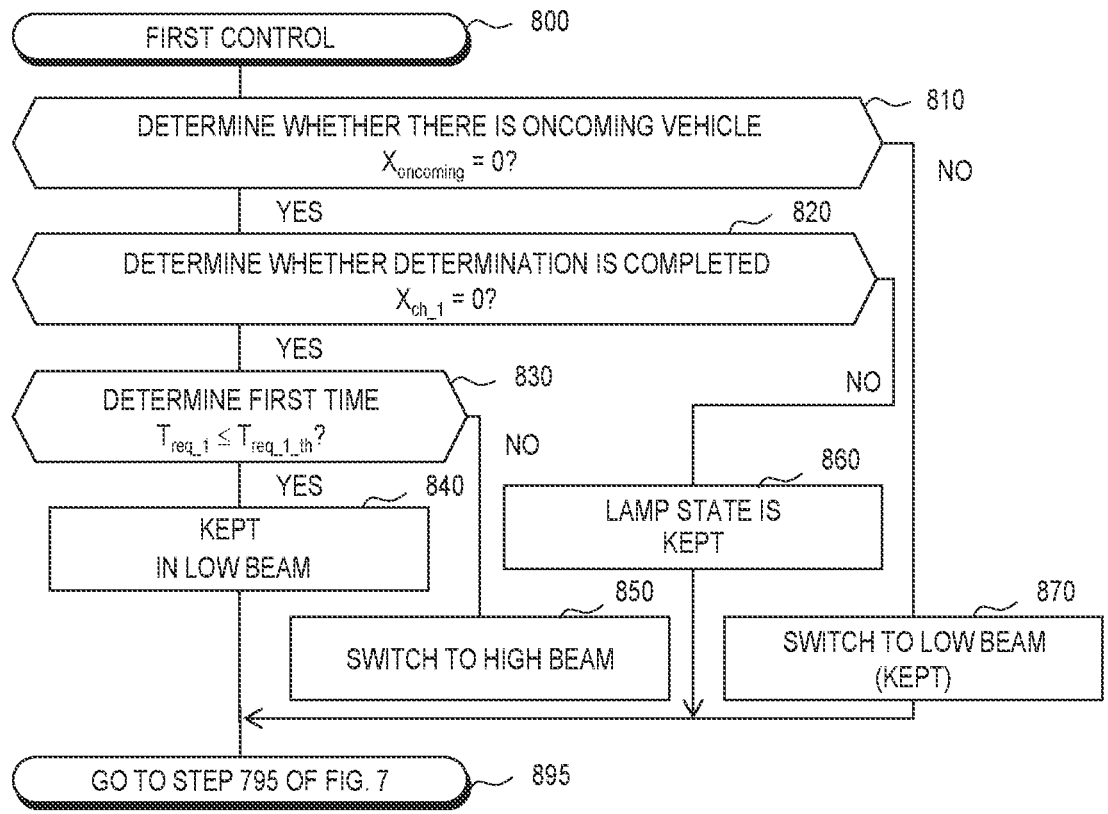
FIG. 8 is a flowchart showing a routine executed by the headlamp control device according to the embodiment of the present disclosure.

In a case where it is determined as "YES" in step 730, the process proceeds to step 740 and the CPU executes a routine shown in FIG. 8. Therefore, when the process proceeds to step 740, the CPU starts a process from step 800 of FIG. 8, proceeds to step 810, and determines whether an oncoming vehicle flag $X_{oncoming}$ has a value of "0". The oncoming vehicle flag $X_{oncoming}$ is a flag indicating whether the oncoming vehicle is approaching the subject vehicle 100. The value of the oncoming vehicle flag $X_{oncoming}$ is set to "1" when the oncoming vehicle is approaching the subject vehicle 100. Meanwhile, the value of the oncoming vehicle flag $X_{oncoming}$ is set to "0" when the oncoming vehicle is not approaching the subject vehicle 100.

In a case where it is determined as "YES" in step 810, the process proceeds to step 820 and the CPU determines whether a first determination completion flag $X_{ch\_1}$ has a value of "0". The first determination completion flag $X_{ch\_1}$ is a flag indicating whether it is a time which is immediately after determining "YES" in step 730 of FIG. 7. The value of the first determination completion flag $X_{ch\_1}$ is set to "1" when a determination process of the subsequent step 830 is executed, and set to "0" when it is determined as "NO" in step 730 of FIG. 7 or determined as "NO" in step 810.

In a case where it is determined as "YES" in step 820, the process proceeds to step 830 and the CPU determines whether the first time $T_{req\_1}$ is equal to or shorter than the first determination time $T_{req\_1\_ch}$.

In a case where it is determined as "YES" in step 830, the process proceeds to step 840, and the CPU keeps the lamp state as the state that it is in at that time (that is, the low-beam state). The CPU proceeds to step 795 of FIG. 7 via step 895 and ends this routine.

Meanwhile, in a case where it is determined as "NO" in step 830, the process proceeds to step 850, and the CPU switches the lamp state from the low-beam state to the high-beam state. The CPU proceeds to step 795 of FIG. 7 via step 895 and ends this routine.

In a case where it is determined as "NO" in step 820, the process proceeds to step 860, and the CPU keeps the lamp state as the state that it is in at that time. The CPU proceeds to step 795 of FIG. 7 via step 895 and ends this routine.

In a case where it is determined as "NO" in step 810, the process proceeds to step 870. If the lamp state is the high-beam state at that time, the CPU switches the lamp state from the high-beam state to the low-beam state. If the lamp state is the low-beam state at that time, the CPU keeps the lamp state as the low-beam state. The CPU proceeds to step 795 of FIG. 7 via step 895 and ends this routine.

Figure 9:
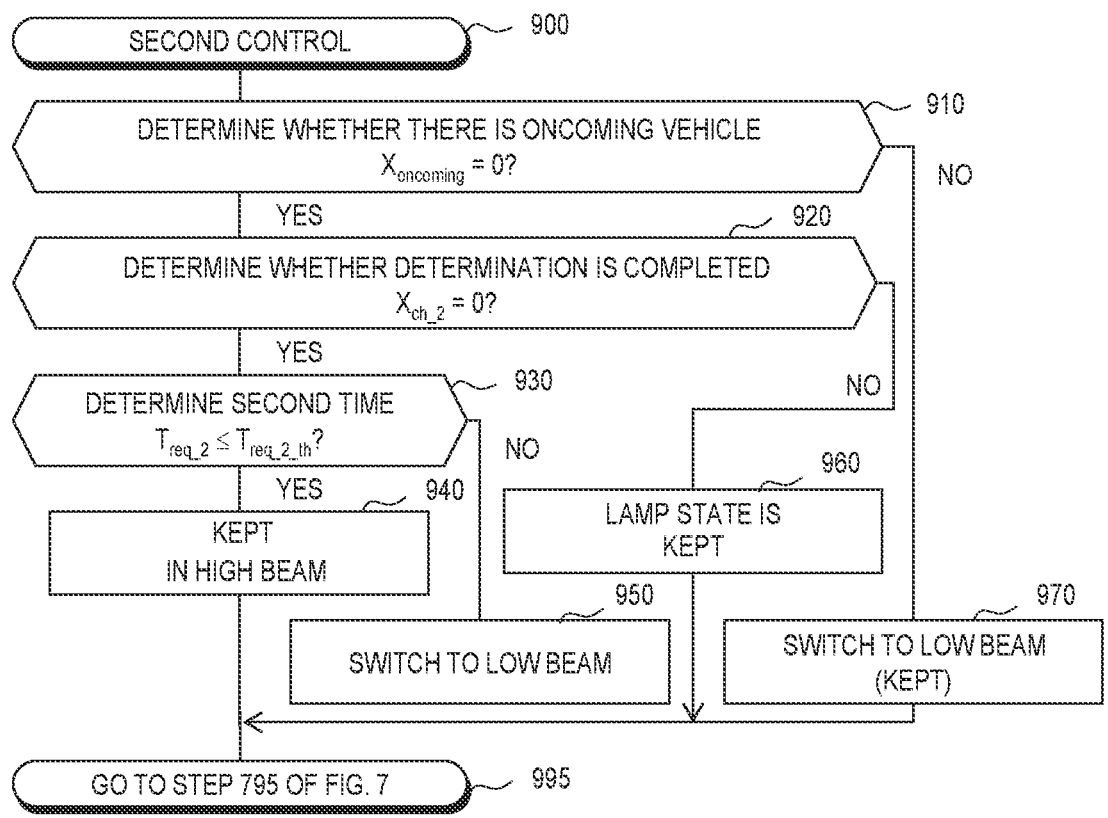
FIG. 9 is a flowchart showing a routine executed by the headlamp control device according to the embodiment of the present disclosure.

In a case where it is determined as "NO" in step 730 of FIG. 7, the process proceeds to step 750 and the CPU executes a routine shown in FIG. 9. Therefore, when the process proceeds to step 750, the CPU starts a process from step 900 of FIG. 9, proceeds to step 910, and determines whether the oncoming vehicle flag $X_{oncoming}$ has a value of "0".

In a case where it is determined as "YES" in step 910, the process proceeds to step 920 and the CPU determines whether or not a second determination completion flag $X_{ch\_2}$ has a value of "0". The second determination completion flag $X_{ch\_2}$ is a flag indicating whether it is a time which is immediately after determining "NO" in step 730 of FIG. 7. The value of the second determination completion flag $X_{ch\_2}$ is set to "1" when a determination process of the subsequent step 930 is executed, and set to "0" when it is determined as "YES" in step 730 of FIG. 7 or determined as "NO" in step 910.

In a case where it is determined as "YES" in step 920, the process proceeds to step 930 and the CPU determines whether the second time $T_{req\_2}$ is equal to or shorter than the second determination time $T_{req\_2\_ch}$.

In a case where it is determined as "YES" in step 930, the process proceeds to step 940, and the CPU keeps the lamp state as the state that it is in at that time (that is, the high-beam state). The CPU proceeds to step 795 of FIG. 7 via step 995 and ends this routine.

Meanwhile, in a case where it is determined as "NO" in step 930, the process proceeds to step 950, and the CPU switches the lamp state from the high-beam state to the low-beam state. The CPU proceeds to step 795 of FIG. 7 via step 995 and ends this routine.

In a case where it is determined as "NO" in step 920, the process proceeds to step 960, and the CPU keeps the lamp state as the state that it is in at that time. The CPU proceeds to step 795 of FIG. 7 via step 995 and ends this routine.

In a case where it is determined as "NO" in step 910, the process proceeds to step 970. If the lamp state is the high-beam state at that time, the CPU switches the lamp state from the high-beam state to the low-beam state. If the lamp state is the low-beam state at that time, the CPU keeps the lamp state as the low-beam state. The CPU proceeds to step 795 of FIG. 7 via step 995 and ends this routine.

In a case where it is determined as "NO" in step 710 or step 720 of FIG. 7, the process proceeds to step 795 and the CPU ends this routine.

The specific operation of the headlamp control device 10 has been described.

First Modified Example

Hereinafter, the headlamp control device 10 according to a first modified example of the embodiment of the present disclosure will be described. The illuminance detection device 72 according to the first modified example includes an illuminance sensor that detects illuminance in front of the subject vehicle 100 in addition to the illuminance sensor that detects the illuminance around the subject vehicle 100. The illuminance sensor is attached to the subject vehicle 100 so as to detect the illuminance in front of the subject vehicle 100. The illuminance detection device 72 transmits the illuminance data detected by such an illuminance sensor to the ECU 90. The ECU 90 acquires the illuminance in front of the subject vehicle 100 as a front illuminance LUM_F, based on the transmitted data.

The headlamp control device 10 according to the first modified example is also configured to be capable of executing the headlamp control. The headlamp control also includes two control processes, the automatic on/off control and the automatic switching control. In the first modified example, the automatic on/off control is the same as the automatic on/off control according to the embodiment stated above. On the other hand, in the first modified example, the headlamp control device 10 executes the automatic switching control as follows in a case where the automatic switching control is requested while the headlamps 21 are turned on.

That is, in a case where the ambient illuminance LUM_s is equal to or lower than the predetermined switching illuminance LUM_ch when the headlamps 21 are turned on in the low-beam state, the ECU 90 estimates the time required for the subject vehicle 100 to enter the tunnel in front of the subject vehicle as the first time $T_{req\_1}$. The ECU 90 determines whether the first time $T_{req\_1}$ is equal to or shorter than the first determination time $T_{req\_1\_th}$.

In a case where the first time $T_{req\_1}$ is longer than the first determination time $T_{req\_1\_th}$, the ECU 90 switches the lamp state from the low-beam state to the high-beam state. In this case, the ECU 90 switches the lamp state from the high-beam state to the low-beam state when the ambient illuminance LUM_S is equal to or higher than the predetermined switching illuminance LUM_ch due to, for example, the oncoming vehicle approaching the subject vehicle before the subject vehicle 100 enters the next tunnel.

On the other hand, in a case where the first time $T_{req\_1}$ is equal to or shorter than the first determination time $T_{req\_1\_th}$, the ECU 90 further determines whether an illuminance inside the tunnel in front to the subject vehicle 100 is equal to or lower than the predetermined switching illuminance LUM_ch. The ECU 90 refers to the front illuminance LUM_F acquired at that time as the illuminance inside of the tunnel in front of the subject vehicle 100. Hereinafter, the illuminance inside the tunnel in front of the subject vehicle 100 will be referred to as "tunnel illuminance LUM_T."

Figure 10A:
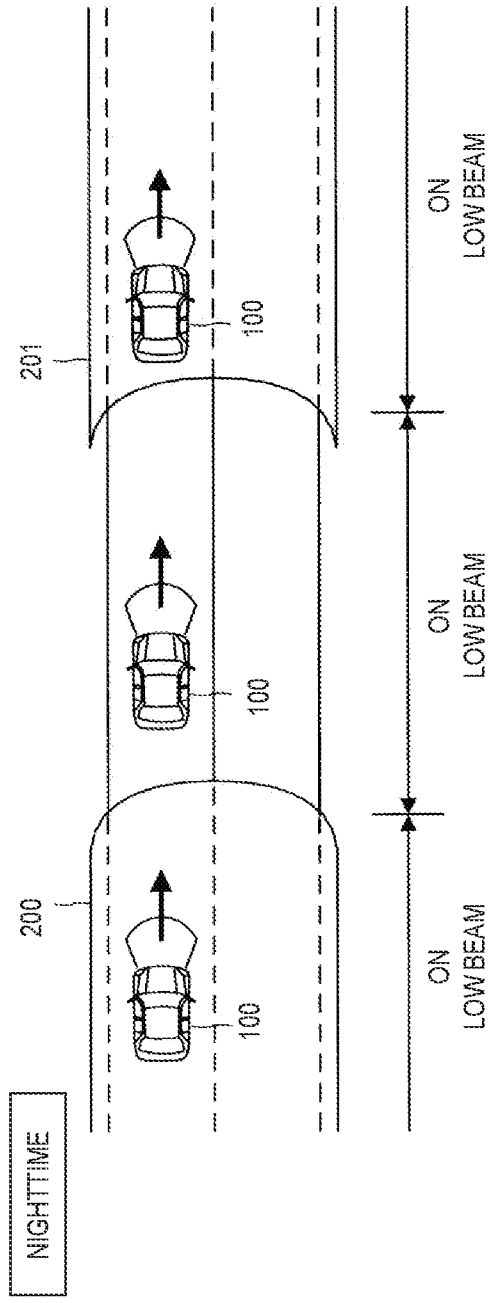
FIG. 10A and FIG. 10B are diagrams illustrating an operation of a headlamp control device according to a first modified example of the embodiment of the present disclosure, in a case where the subject vehicle is traveling in a low-beam state inside a first tunnel at nighttime when a required time for the subject vehicle to travel between tunnels is relatively short.

In a case where the tunnel illuminance LUM_T is higher than the predetermined switching illuminance LUM_ch, the ECU 90 keeps the lamp state as the low-beam state, as shown in FIG. 10A. In this case, the subject vehicle 100 travels in the low-beam state in the first tunnel 200, keeps the lamp state as the low-beam state while traveling when leaving the tunnel 200, and keeps the lamp state as the low-beam state while traveling when entering the second tunnel 201.

Figure 10B:
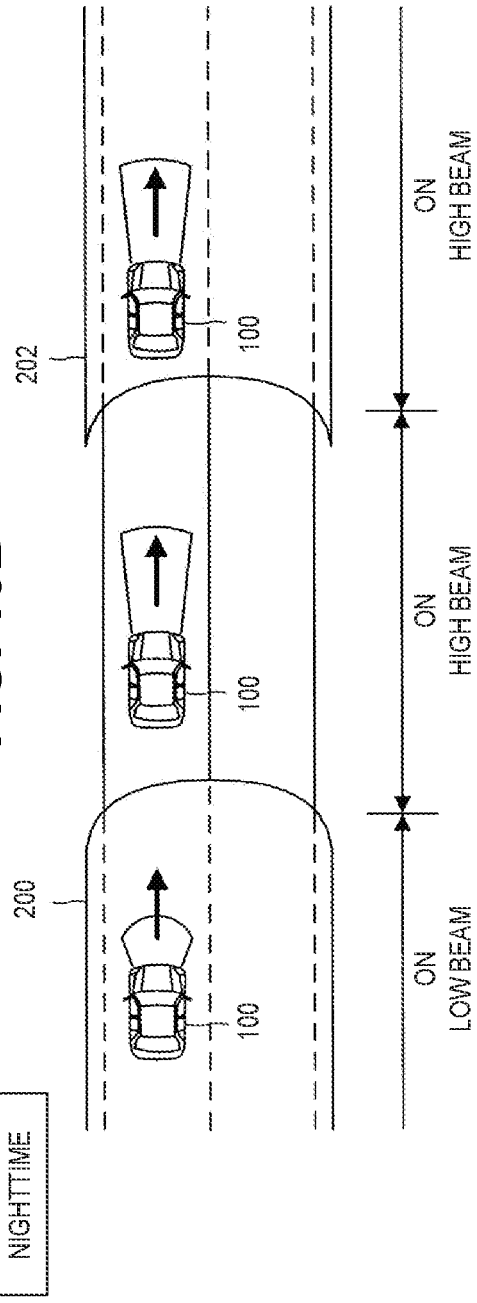

Meanwhile, in a case where the tunnel illuminance LUM_T is equal to or lower than the predetermined switching illuminance LUM_ch, the ECU 90 switches the lamp state from the low-beam state to the high-beam state, as shown in FIG. 10B. In this case, the subject vehicle 100 travels in the low-beam state in the first tunnel 200, travels in the high-beam state when leaving the tunnel 200, and keeps the lamp state as the high-beam state while traveling when entering the second tunnel 202. In this case, the ECU 90 switches the lamp state from the high-beam state to the low-beam state when the ambient illuminance LUM_S is equal to or higher than the predetermined switching illuminance LUM_ch due to, for example, the oncoming vehicle approaching the subject vehicle before the subject vehicle 100 enters the second tunnel 202.

Moreover, in a case where the ambient illuminance LUM_s is higher than the predetermined switching illuminance LUM_ch when the headlamps 21 are turned on in the high-beam state, the ECU 90 estimates the time required for the subject vehicle 100 to enter the tunnel in front of the subject vehicle as the second time $T_{req\_2}$. The ECU 90 determines whether the second time $T_{req\_2}$ is equal to or shorter than the second determination time $T_{req\_2\_th}$.

In a case where the second time $T_{req\_2}$ is longer than the second determination time $T_{req\_2\_th}$, the ECU 90 switches the lamp state from the high-beam state to the low-beam state.

On the other hand, in a case where the second time $T_{req\_2}$ is equal to or shorter than the second determination time $T_{req\_2\_th}$, the ECU 90 further determines whether the tunnel illuminance LUM T (illuminance inside the tunnel in front to the subject vehicle 100) is equal to or lower than the predetermined switching illuminance LUM_ch.

Figure 11A:
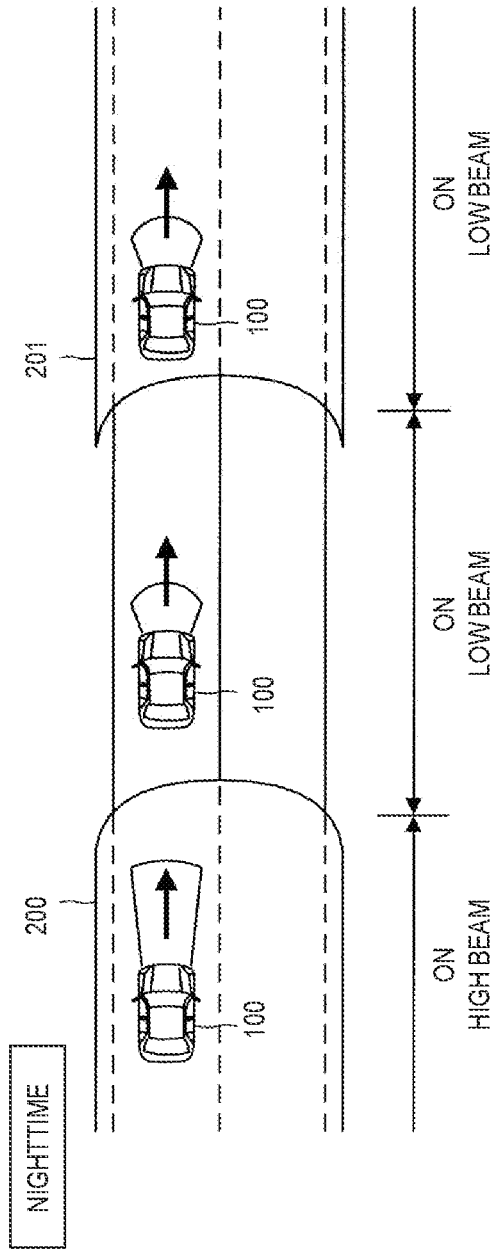
FIG. 11A and FIG. 11B are diagrams illustrating an operation of a headlamp control device according to the first modified example of the embodiment of the present disclosure, in a case where the subject vehicle is traveling in a high-beam state inside the first tunnel at nighttime when a required time for the subject vehicle to travel between tunnels is relatively short.

In a case where the tunnel illuminance LUM_T is higher than the predetermined switching illuminance LUM_ch, the ECU 90 switches the lamp state from the high-beam state to the low-beam state, as shown in FIG. 11A. In this case, the subject vehicle 100 travels in the high-beam state in the first tunnel 200, travels in the low-beam state when leaving the tunnel 200, and keeps the lamp state as the low-beam state while traveling when entering the second tunnel 201.

Figure 11B:
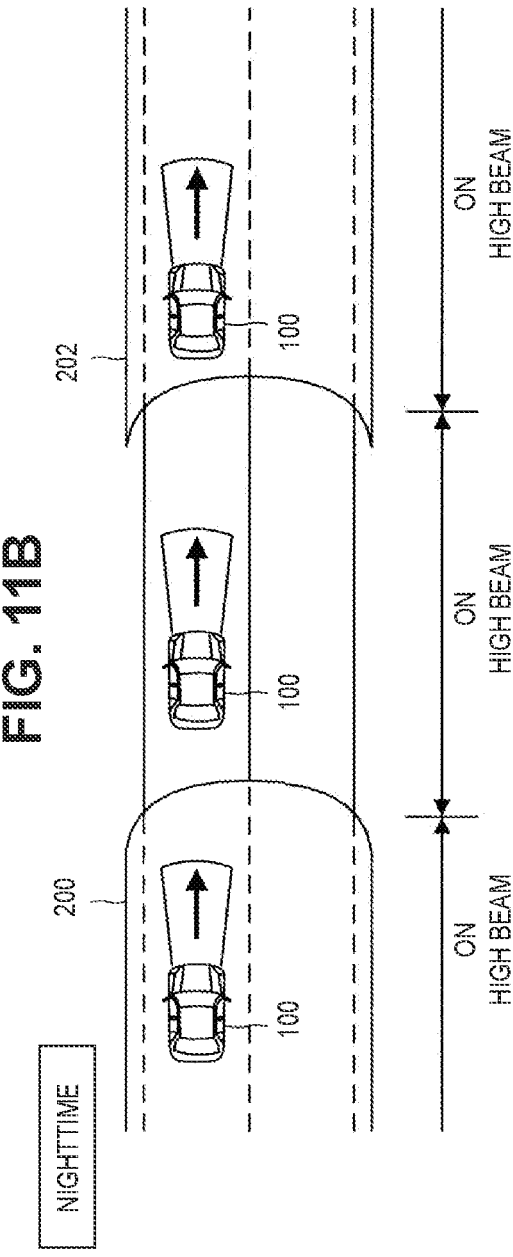

Meanwhile, in a case where the tunnel illuminance LUM_T is equal to or lower than the predetermined switching illuminance LUM_ch, the ECU 90 keeps the lamp state as the high-beam state, as shown in FIG. 11B. In this case, the subject vehicle 100 travels in the high-beam state in the first tunnel 200, keeps the lamp state as the high-beam state while traveling when leaving the tunnel 200, and keeps the lamp state as the high-beam state while traveling when entering the second tunnel 202. In this case, the ECU 90 switches the lamp state from the high-beam state to the low-beam state when the ambient illuminance LUM_S is equal to or higher than the predetermined switching illuminance LUM_ch due to, for example, the oncoming vehicle approaching the subject vehicle before the subject vehicle 100 enters the second tunnel 202.

The operation of the headlamp control device 10 according to the first modified example has been described. Accordingly, in a case where, when the subject vehicle 100, traveling in the tunnel in the low-beam state, leaves the tunnel at nighttime, the illuminance inside the next tunnel is relatively low and it is desirable to drive in the high-beam state, the lamp state is switched from the low-beam state to the high-beam state when the subject vehicle 100 leaves the first tunnel. Consequently, the driver can obtain better visibility while driving the subject vehicle 100 on a road between the tunnels.

Specific Operation of Headlamp Control Device According to First Modified Example The specific operation of the headlamp control device 10 according to the first modified example will be described hereinbelow. The CPU according to the first modified example executes the routines shown in FIGS. 6 and 7, but executes a routine shown in FIG. 12 instead of the routine shown in FIG. 8 when the process proceeds to step 740 of FIG. 7, and executes a routine shown in FIG. 13 instead of the routine shown in FIG. 9 when the process proceeds to step 750 of FIG. 7.

Figure 12:
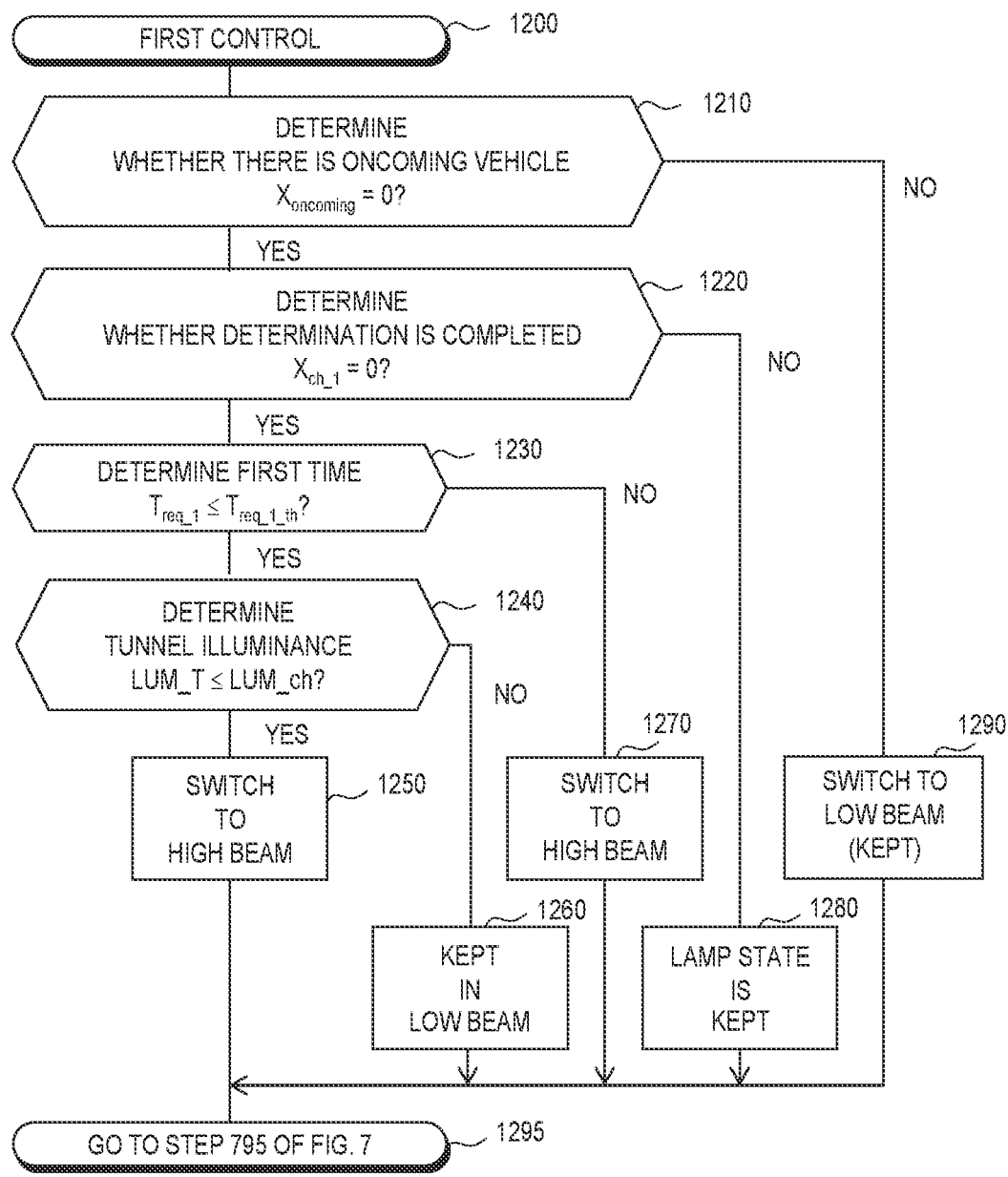
FIG. 12 is a flowchart showing a routine executed by the headlamp control device according to the first modified example of the embodiment of the present disclosure.

Therefore, when the process proceeds to step 740 of FIG. 7, the CPU starts a process from step 1200 of FIG. 12, proceeds to step 1210 and determines whether the oncoming vehicle flag $X_{oncoming}$ has a value of "0".

In a case where it is determined as "YES" in step 1210, the process proceeds to step 1220 and the CPU determines whether the first determination completion flag $X_{ch\_1}$ has a value of "0". The value of the first determination completion flag $X_{ch\_1}$ is set to "1" when a determination process of the subsequent step 1230 is executed, and set to "0" when it is determined as "NO" in step 730 of FIG. 7 or determined as "NO" in step 1210.

In a case where it is determined as "YES" in step 1220, the process proceeds to step 1230 and the CPU determines whether the first time $T_{req\_1}$ is equal to or shorter than the first determination time $T_{req\_1\_ch}$.

In a case where it is determined as "YES" in step 1230, the process proceeds to step 1240 and the CPU determines whether the tunnel illuminance LUM_T is equal to or lower than the predetermined switching illuminance LUM_ch.

In a case where it is determined as "YES" in step 1240, the process proceeds to step 1250, and the CPU switches the lamp state from the low-beam state to the high-beam state. The CPU proceeds to step 795 of FIG. 7 via step 1295 and ends this routine.

On the other hand, in a case where it is determined as "NO" in step 1240, the process proceeds to step 1260, and the CPU keeps the lamp state as the state that it is in at that time (that is, the low-beam state). The CPU proceeds to step 795 of FIG. 7 via step 1295 and ends this routine.

Moreover, in a case where it is determined as "NO" in step 1230, the process proceeds to step 1270, and the CPU switches the lamp state from the high-beam state to the low-beam state. The CPU proceeds to step 795 of FIG. 7 via step 1295 and ends this routine.

In a case where it is determined as "NO" in step 1220, the process proceeds to step 1280, and the CPU keeps the lamp state as the state that it is in at that time. The CPU proceeds to step 795 of FIG. 7 via step 1295 and ends this routine.

In a case where it is determined as "NO" in step 1210, the process proceeds to step 1290. If the lamp state is the high-beam state at that time, the CPU switches the lamp state from the high-beam state to the low-beam state. If the lamp state is the low-beam state at that time, the CPU keeps the lamp state as the low-beam state. The CPU proceeds to step 795 of FIG. 7 via step 1295 and ends this routine.

Figure 13:
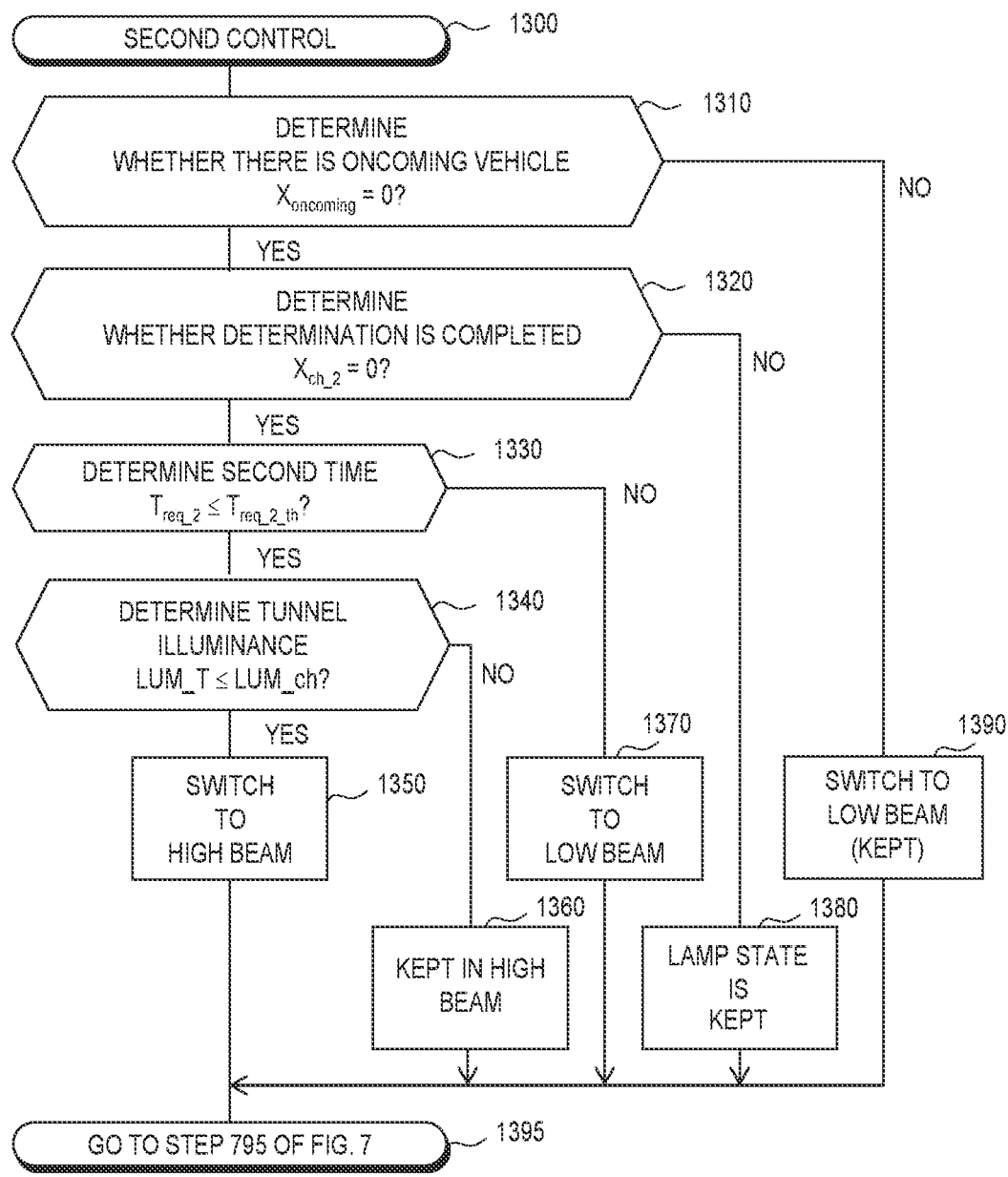
FIG. 13 is a flowchart showing a routine executed by the headlamp control device according to the first modified example of the embodiment of the present disclosure.

Moreover, when the process proceeds to step 750 of FIG. 7, the CPU starts a process from step 1300 of FIG. 13, proceeds to step 1310, and determines whether the oncoming vehicle flag $X_{oncoming}$ has a value of "0".

In a case where it is determined as "YES" in step 1310, the process proceeds to step 1320 and the CPU determines whether the second determination completion flag $X_{ch\_2}$ has a value of "0". The value of the second determination completion flag $X_{ch\_2}$ is set to "1" when a determination process of the subsequent step 1330 is executed, and set to "0" when it is determined as "YES" in step 730 of FIG. 7 or determined as "NO" in step 1310.

In a case where it is determined as "YES" in step 1320, the process proceeds to step 1330 and the CPU determines whether the second time $T_{req\_2}$ is equal to or shorter than the second determination time $T_{req\_2\_ch}$.

In a case where it is determined as "YES" in step 1330, the process proceeds to step 1340 and the CPU determines whether the tunnel illuminance LUM_T is equal to or lower than the predetermined switching illuminance LUM_ch.

In a case where it is determined as "YES" in step 1340, the process proceeds to step 1350, and the CPU switches the lamp state from the low-beam state to the high-beam state. The CPU proceeds to step 795 of FIG. 7 via step 1395 and ends this routine.

On the other hand, in a case where it is determined as "NO" in step 1340, the process proceeds to step 1360, and the CPU keeps the lamp state as the state that it is in at that time (that is, the low-beam state). The CPU proceeds to step 795 of FIG. 7 via step 1395 and ends this routine.

Moreover, in a case where it is determined as "NO" in step 1330, the process proceeds to step 1370, and the CPU switches the lamp state from the high-beam state to the low-beam state. The CPU proceeds to step 795 of FIG. 7 via step 1395 and ends this routine.

In a case where it is determined as "NO" in step 1320, the process proceeds to step 1380, and the CPU keeps the lamp state as the state that it is in at that time. The CPU proceeds to step 795 of FIG. 7 via step 1395 and ends this routine.

In a case where it is determined as "NO" in step 1310, the process proceeds to step 1390. If the lamp state is the high-beam state at that time, the CPU switches the lamp state from the high-beam state to the low-beam state. If the lamp state is the low-beam state at that time, the CPU keeps the lamp state as the low-beam state. The CPU proceeds to step 795 of FIG. 7 via step 1395 and ends this routine.

The specific operation of the headlamp control device 10 according to the first modified example has been described.

Second Modified Example

Hereinafter, the headlamp control device 10 according to a second modified example of the embodiment of the present disclosure will be described.

The headlamp control device 10 according to the second modified example is also configured to be capable of executing the headlamp control. The headlamp control also includes two control processes, the automatic on/off control and the automatic switching control. In the second modified example, the automatic switching control is the same as the automatic switching control according to the embodiment or the first modified example stated above. On the other hand, in the second modified example, the headlamp control device 10 executes the automatic on/off control as follows in a case where the automatic on/off control is requested.

That is, in a case where the ambient illuminance LUM_S is equal to or lower than a predetermined on and off illuminance LUM_on when the headlamps 21 are turned off, the ECU 90 turns the headlamps 21 on.

Meanwhile, in a case where the ambient illuminance LUM_s is higher than the predetermined on and off illuminance LUM_on when the headlamps 21 are turned on, the ECU 90 estimates the time required for the subject vehicle 100 to enter the tunnel in front of the subject vehicle as a required time $T_{req}$. The ECU 90 determines whether the required time $T_{req}$ is equal to or shorter than a predetermined determination time $T_{req\_th}$. In a case where no tunnel is detected in front of the subject vehicle 100, the ECU 90 determines that the required time $T_{req}$ is longer than the predetermined determination time $T_{req\_th}$.

In a case where the required time $T_{req}$ is longer than the predetermined determination time $T_{req\_th}$, the ECU 90 turns the headlamps 21 off. For example, as shown in FIG. 14A, when the subject vehicle 100, traveling in the first tunnel 200 while the headlamps 21 are turned on, leaves the tunnel 200 during the daytime, the headlamps 21 are turned off if it is determined that the required time $T_{req}$ is longer than the predetermined determination time $T_{req\_th}$, and the headlamps 21 are turned on if the subject vehicle 100 enters the second tunnel 201.

On the other hand, in a case where the required time $T_{req}$ is equal to or lower than the predetermined determination time $T_{req\_th}$, the ECU 90 keeps the headlamps 21 turned on. For example, as shown in FIG. 14B, when the subject vehicle 100, traveling in the first tunnel 200 while the headlamps 21 are turned on, leaves the tunnel 200 during the daytime, the headlamps 21 are kept turned on if it is determined that the required time $T_{req}$ is equal to or shorter than the predetermined determination time $T_{req\_th}$, and the headlamps 21 are kept turned on if the subject vehicle 100 enters the second tunnel 202.

The operation of the headlamp control device 10 according to the second modified example has been described. Accordingly, in a case where the subject vehicle 100 leaves the first tunnel and then enters the second tunnel in a relatively short time during the daytime, the headlamps 21 are kept turned on after the subject vehicle 100 leaves the first tunnel. Even after the subject vehicle 100 enters the second tunnel, the headlamps 21 are kept turned on. Therefore, in a case where the subject vehicle 100 is traveling on a road where the tunnels are built close to each other, it is possible to prevent the headlamps 21 being turned on and off at short intervals. Consequently, it is possible to prevent the driver of the subject vehicle 100 from being inconvenienced.

Specific Operation of Headlamp Control Device According to Second Modified Example The specific operation of the headlamp control device 10 according to the second modified example will be described hereinbelow. The CPU according to the second modified example executes a routine shown in FIG. 15 instead of the routine shown in FIG. 6. The CPU according to the second modified example also executes the routine shown in FIG. 7.

Figure 15:
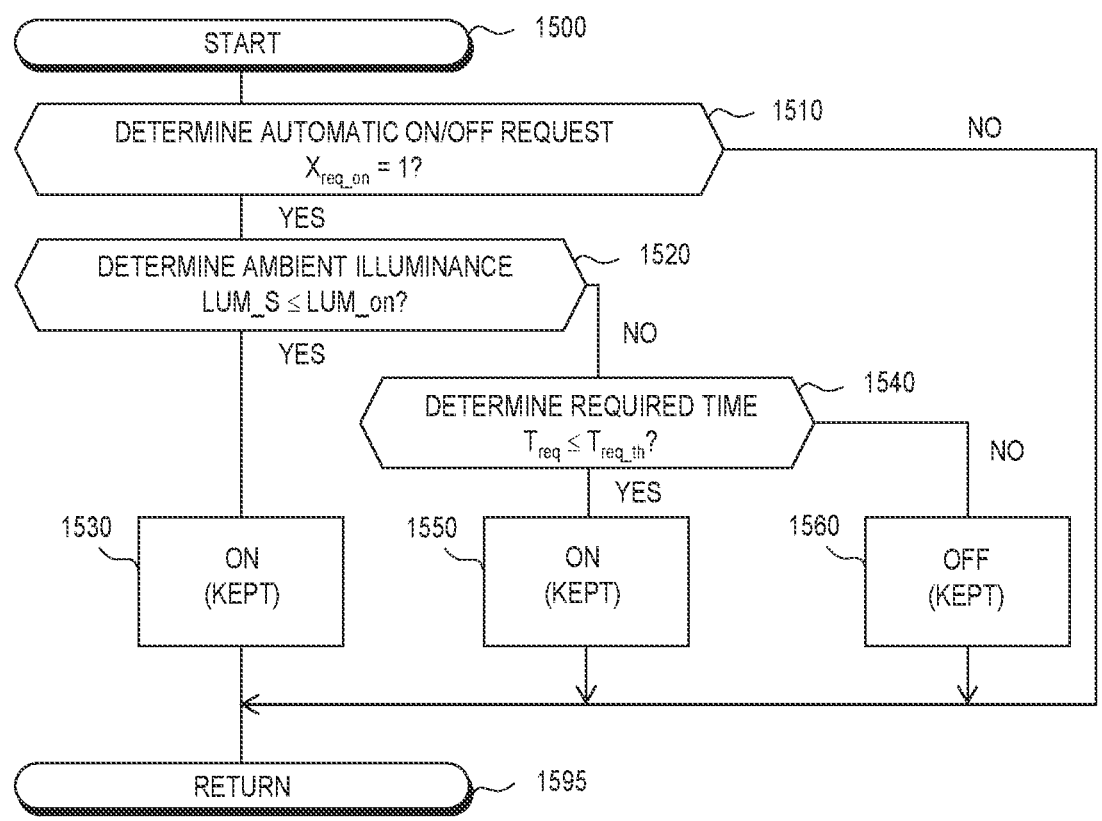
FIG. 15 is a flowchart showing a routine executed by the headlamp control device according to the second modified example of the embodiment of the present disclosure.

The CPU starts a process from step 1500 of FIG. 15 at a predetermined timing, proceeds to step 1510, and determines whether the automatic on/off request flag $X_{req\_on}$ has a value of "1".

In a case where it is determined as "YES" in step 1510, the process proceeds to step 1520 and the CPU determines whether the ambient illuminance LUM_S is equal to or lower than the predetermined on and off illuminance LUM_on.

In a case where it is determined as "YES" in step 1520, the process proceeds to step 1530, and the CPU turns the headlamps 21 on if the headlamps 21 are turned off at that time, and keeps the headlamps 21 turned on if the headlamps 21 are turned on at that time. The CPU proceeds to step 1595 and ends this routine.

Meanwhile, in a case where it is determined as "NO" in step 1520, the process proceeds to step 1540 and the CPU determines whether or not the required time $T_{req}$ is equal to or shorter than the predetermined determination time $T_{req\_ch}$.

In a case where it is determined as "YES" in step 1540, the process proceeds to step 1550, and the CPU turns the headlamps 21 on if the headlamps 21 are turned off at that time, and keeps the headlamps 21 turned on if the headlamps 21 are turned on at that time. The CPU proceeds to step 1595 and ends this routine.

Meanwhile, in a case where it is determined as "NO" in step 1540, the process proceeds to step 1560, and the CPU turns the headlamps 21 off if the headlamps 21 are turned on at that time, and keeps the headlamps 21 turned off if the headlamps 21 are turned off at that time. The CPU proceeds to step 1595 and ends this routine.

The specific operation of the headlamp control device 10 according to the second modified example has been described.

The present disclosure is not limited to the embodiments and the modified examples stated above, and various modifications can be adopted within the scope of the present disclosure.

What is claimed is:

1. A headlamp control device comprising:
an illuminance detection device configured to detect an ambient illuminance which is an illuminance around a subject vehicle; and
a control unit configured to execute headlamp control for
automatically switching a state of a headlamp of the subject vehicle between an ON state where the headlamp is turned on and an OFF state where the headlamp is turned off, and
automatically switching the state of the headlamp between a high-beam state where a headlight angle of the headlamp is set to a high-beam angle and a low-beam state where the headlight angle is set to a low-beam angle,
wherein the control unit is configured to:
in a case where the ambient illuminance is equal to or lower than a predetermined on and off illuminance, switch the headlamp state from the OFF state to the ON state,
in a case where the ambient illuminance is higher than the predetermined on and off illuminance, switch the headlamp state from the ON state to the OFF state,
in a case where the ambient illuminance is equal to or lower than a predetermined switching illuminance when the headlamp state is the ON state, estimate a time required for the subject vehicle to travel to an entrance of a tunnel in front of the subject vehicle, as a first time,
in a case where the first time is longer than a first determination time, switch the headlamp state from the low-beam state to the high-beam state, and
in a case where the first time is equal to or shorter than the first determination time, keep the headlamp state as the low-beam state.

2. The headlamp control device according to claim 1, wherein the control unit is configured to:
in a case where the ambient illuminance is higher than the predetermined switching illuminance when the headlamp state is the ON state, estimate a time required for the subject vehicle to travel to the entrance of the tunnel in front of the subject vehicle, as a second time, and in a case where the second time is longer than a second determination time, switch the headlamp state from the high-beam state to the low-beam state, and in a case where the second time is equal to or shorter than the second determination time, keep the headlamp state as the high-beam state.

3. A headlamp control device comprising:

an illuminance detection device that detects an illuminance around a subject vehicle as an ambient illuminance, and detects an illuminance in a tunnel in front of the subject vehicle as a tunnel illuminance; and a control unit configured to execute headlamp control for automatically switching a state of a headlamp of the subject vehicle between an ON state where the headlamp is turned on and an OFF state where the headlamp is turned off, and automatically switching the state of the headlamp between a high-beam state where a headlight angle of the headlamp is set to a high-beam angle and a low-beam state where the headlight angle is set to a low-beam angle, wherein the control unit is configured to:

in a case where the ambient illuminance is equal to or lower than a predetermined on and off illuminance, switch the headlamp state from the OFF state to the ON state, in a case where the ambient illuminance is higher than the predetermined on and off illuminance, switch the headlamp state from the ON state to the OFF state, in a case where the ambient illuminance is equal to or lower than a predetermined switching illuminance when the headlamp state is the ON state, estimate a time required for the subject vehicle to travel to an entrance of the tunnel in front of the subject vehicle, as a first time, in a case where the first time is longer than a first determination time, switch the headlamp state from the low-beam state to the high-beam state, in a case where the first time is equal to or shorter than the first determination time and the tunnel illuminance is equal to or lower than the predetermined switching illuminance, switch the headlamp state from the low-beam state to the high-beam state, and in a case where the first time is equal to or shorter than the first determination time and the tunnel illuminance is higher than the predetermined switching illuminance, keep the headlamp state as the low-beam state.

4. The headlamp control device according to claim 3, wherein the control unit is configured to:

in a case where the ambient illuminance is higher than the predetermined switching illuminance when the headlamp state is the ON state, estimate a time required for the subject vehicle to travel to the entrance of the tunnel in front of the subject vehicle, as a second time, in a case where the second time is longer than the second determination time, switch the headlamp state from the high-beam state to the low-beam state, in a case where the second time is equal to or shorter than the second determination time and the tunnel illuminance is equal to or lower than the predetermined switching illuminance, keep the headlamp state as the high-beam state, and in a case where the second time is equal to or shorter than the second determination time and the tunnel illuminance is higher than the predetermined switching illuminance, switch the headlamp state from the high-beam state to the low-beam state.

5. A headlamp control device comprising:

an illuminance detection device that detects an ambient illuminance which is an illuminance around a subject vehicle; and a control unit configured to execute headlamp control for automatically switching a state of a headlamp of the subject vehicle between an ON state where the headlamp is turned on and an OFF state where the headlamp is turned off, wherein the control unit is configured to:

in a case where the ambient illuminance is equal to or lower than a predetermined on and off illuminance, switch the headlamp state from the OFF state to the ON state, in a case where the ambient illuminance is higher than the predetermined on and off illuminance, estimate a time required for the subject vehicle to travel to an entrance of a tunnel in front of the subject vehicle, as a required time, in a case where the required time is longer than a predetermined determination time, switch the headlamp state from the ON state to the OFF state, and in a case where the required time is equal to or shorter than the predetermined determination time, keep the headlamp state as the ON state.

6. A headlamp control device comprising:

an illuminance detection device that detects an illuminance around a subject vehicle as an ambient illuminance; and a control unit configured to execute headlamp control for automatically switching a state of a headlamp of the subject vehicle between an ON state where the headlamp is turned on and an OFF state where the headlamp is turned off, and automatically switching the state of the headlamp between a high-beam state where a headlight angle of the headlamp is set to a high-beam angle and a low-beam state where the headlight angle is set to a low-beam angle, wherein the control unit is configured to:

in a case where the ambient illuminance is equal to or lower than a predetermined on and off illuminance, switch the headlamp state from the OFF state to the ON state, in a case where the ambient illuminance is higher than the predetermined on and off illuminance, estimate a time required for the subject vehicle to travel to an entrance of a tunnel in front of the subject vehicle, as a required time, in a case where the required time is longer than a predetermined determination time, switch the headlamp state from the ON state to the OFF state, in a case where the required time is equal to or shorter than the predetermined determination time, keep the headlamp state as the ON state, in a case where the ambient illuminance is equal to or lower than a predetermined switching illuminance when the headlamp state is the ON state, estimate a time required for the subject vehicle to travel to the entrance of the tunnel in front of the subject vehicle, as a first time, in a case where the first time is longer than a first determination time, switch the headlamp state from the low-beam state to the high-beam state, and in a case where the first time is equal to or shorter than the first determination time, keep the headlamp state as the low-beam state.

7. The headlamp control device according to claim 6, wherein the control unit is configured to:
- in a case where the ambient illuminance is higher than the predetermined switching illuminance when the headlamp state is the ON state, estimate a time required for the subject vehicle to travel to the entrance of the tunnel in front of the subject vehicle, as a second time, and
- in a case where the second time is longer than a second determination time, switch the headlamp state from the high-beam state to the low-beam state, and
- in a case where the second time is equal to or shorter than the second determination time, keep the headlamp state as the high-beam state.

\* \* \* \* \*